United States Patent
Noda et al.

(10) Patent No.: US 12,242,133 B2
(45) Date of Patent: Mar. 4, 2025

(54) IMAGING LENS AND IMAGING APPARATUS

(71) Applicant: FUJIFILM Corporation, Tokyo (JP)

(72) Inventors: Taiga Noda, Saitama (JP); Ryoko Tomioka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 484 days.

(21) Appl. No.: 17/667,312

(22) Filed: Feb. 8, 2022

(65) Prior Publication Data
US 2022/0276464 A1    Sep. 1, 2022

(30) Foreign Application Priority Data
Feb. 22, 2021    (JP) .................. 2021-026601

(51) Int. Cl.
*G02B 9/12*    (2006.01)
(52) U.S. Cl.
CPC ...................... *G02B 9/12* (2013.01)
(58) Field of Classification Search
CPC ....................................................... G02B 9/12
USPC ......................................................... 359/791
See application file for complete search history.

(56) References Cited

U.S. PATENT DOCUMENTS

| | | | | |
|---|---|---|---|---|
| 11,803,030 B2 * | 10/2023 | Noda | ................. | G02B 9/08 |
| 2009/0244724 A1 | 10/2009 | Shibata | | |
| 2012/0069456 A1 | 3/2012 | Suzuki | | |
| 2013/0162886 A1 | 6/2013 | Morooka et al. | | |
| 2018/0372986 A1 | 12/2018 | Maruyama et al. | | |
| 2019/0265441 A1* | 8/2019 | Katayose | ........... | G02B 13/0045 |
| 2020/0033562 A1 | 1/2020 | Tomioka | | |
| 2020/0132973 A1 | 4/2020 | Matsunaga et al. | | |
| 2020/0333569 A1 | 10/2020 | Kondo | | |
| 2020/0341248 A1 | 10/2020 | Iwamoto | | |

FOREIGN PATENT DOCUMENTS

| | | | |
|---|---|---|---|
| EP | 3136147 A1 | | 3/2017 |
| JP | 2003-029143 A | | 1/2003 |
| JP | 2012-063676 A | | 3/2012 |
| JP | 2013-125213 A | | 6/2013 |
| JP | 2013137377 A | * | 7/2013 |
| JP | 5315755 B2 | | 10/2013 |

(Continued)

OTHER PUBLICATIONS

An Office Action mailed by the Japanese Patent Office on May 28, 2024, which corresponds to Japanese Patent Application No. 2021-026601 and is related to U.S. Appl. No. 17/667,312.

(Continued)

*Primary Examiner* — George G. King
(74) *Attorney, Agent, or Firm* — Studebaker Brackett PLLC

(57) ABSTRACT

The imaging lens consists of, in order from the object side, a first lens group having a positive refractive power, a stop, a second lens group having a positive refractive power, and a third lens group. The third lens group includes one or more positive lenses and one or more negative lenses. During focusing, an entirety of the first lens group, the stop, and the second lens group, or an entirety of the second lens group integrally moves as a focus group, and the third lens group remains stationary with respect to an image plane. The imaging lens satisfies predetermined conditional expressions.

18 Claims, 27 Drawing Sheets

EXAMPLE 1

(56) References Cited

FOREIGN PATENT DOCUMENTS

| | | |
|---|---|---|
| JP | 2017-044887 A | 3/2017 |
| JP | 2019-101129 A | 6/2019 |
| JP | 2020-016787 A | 1/2020 |
| JP | 2020-177110 A | 10/2020 |
| JP | 2020-181071 A | 11/2020 |
| JP | 2021-071624 A | 5/2021 |
| WO | 2017/130571 A1 | 8/2017 |
| WO | 2019/220618 A1 | 11/2019 |

OTHER PUBLICATIONS

An Office Action; "Notice of Reasons for Refusal," mailed by the Japanese Patent Office on Nov. 26, 2024, which corresponds to Japanese Patent Application No. 2021-026601 and is related to U.S. Appl. No. 17/667,312; with English language translation.

\* cited by examiner

EXAMPLE 1

EXAMPLE 2

EXAMPLE 3

EXAMPLE 4

EXAMPLE 4

EXAMPLE 5

EXAMPLE 5

EXAMPLE 6

EXAMPLE 7

EXAMPLE 8

EXAMPLE 8

EXAMPLE 9

EXAMPLE 10

EXAMPLE 10

EXAMPLE 11

EXAMPLE 11

EXAMPLE 12

IMAGING LENS AND IMAGING APPARATUS

CROSS-REFERENCE TO RELATED APPLICATION

The present application claims priority under 35 U.S.C. § 119 to Japanese Patent Application No. 2021-026601, filed on Feb. 22, 2021. The above application is hereby expressly incorporated by reference, in its entirety, into the present application.

BACKGROUND

Technical Field

A technique of the present disclosure relates to an imaging lens and an imaging apparatus.

Related Art

In the related art, as imaging lenses used in an imaging apparatus such as a digital camera and a video camera, the lens systems described in JP2020-016787A, JP2017-044887A, and Japanese Patent No. 5315755B are known.

In recent years, there has been a demand for an imaging lens which is configured to have a small size and has good optical performance

SUMMARY

The present disclosure has been made in view of the above circumstances, and an object of the present disclosure is to provide an imaging lens which is configured to have a small size and has good optical performance, and an imaging apparatus comprising the imaging lens.

According to an aspect of the present disclosure, there is provided an imaging lens consisting of, in order from an object side to an image side: a first lens group that has a positive refractive power; a stop; a second lens group that has a positive refractive power; and a third lens group. The third lens group includes one or more positive lenses and one or more negative lenses. During focusing, an entirety of the first lens group, the stop, and the second lens group, or an entirety of the second lens group integrally moves as a focus group, and the third lens group remains stationary with respect to an image plane. Assuming that a back focal length of a whole system at an air conversion distance in a state in which an infinite distance object is in focus is Bf, a focal length of the whole system in a state in which the infinite distance object is in focus is f, a sum of Bf and a distance on an optical axis from a lens surface closest to the object side in the first lens group to a lens surface closest to the image side in the third lens group in a state in which the infinite distance object is in focus is TTL, an open F number in a state in which the infinite distance object is in focus is FNo, and a maximum image height is Ymax, Conditional Expressions (1) and (2) are satisfied.

$$0.1 < Bf/f < 1.2 \tag{1}$$

$$5 < TTL \times FNo/Y\max < 9.2 \tag{2}$$

It is preferable that the imaging lens of the above-mentioned aspect satisfies Conditional Expression (1-3).

$$0.4 < Bf/f < 1 \tag{1-3}$$

It is preferable that the imaging lens of the above-mentioned aspect satisfies Conditional Expression (2-1).

$$5.5 < TTL \times FNo/Y\max < 9.2 \tag{2}$$

Assuming that a focal length of the whole system is f and a focal length of the second lens group is f2 in a state in which an infinite distance object is in focus, it is preferable that the imaging lens of the above-mentioned aspect satisfies Conditional Expression (3), and it is more preferable that the imaging lens satisfies Conditional Expression (3-1).

$$0.2 < f/f2 < 2 \tag{3}$$

$$0.4 < f/f2 < 1.8 \tag{3-1}$$

Assuming that a focal length of the whole system is f and a focal length of the third lens group is f3 in a state in which the infinite distance object is in focus, it is preferable that the imaging lens of the above-mentioned aspect satisfies Conditional Expression (4).

$$-0.5 < f/f3 < -0.05 \tag{4}$$

Assuming that a focal length of the first lens group is f1 and a focal length of the second lens group is f2, it is preferable that the imaging lens of the above-mentioned aspect satisfies Conditional Expression (5).

$$1 < f1/f2 < 3.5 \tag{5}$$

It is preferable that among positive lenses in the second lens group, an Lp lens having a strongest refractive power has a convex surface facing toward the image side. Assuming that a focal length of the second lens group is f2 and a focal length of the Lp lens is f2p, it is preferable that the imaging lens of the above-mentioned aspect satisfies Conditional Expression (6).

$$0.9 < f2/f2p < 3.5 \tag{6}$$

Assuming that a sum of Bf and a distance on the optical axis from the stop to the lens surface closest to the image side in the third lens group in a state in which the infinite distance object is in focus is StI, and a sum of Bf and a distance on the optical axis from an image side surface of the Lp lens to the lens surface closest to the image side in the third lens group in a state in which the infinite distance object is in focus is LpTI, it is preferable that the imaging lens of the above-mentioned aspect satisfies Conditional Expression (7).

$$1 < StI/LpTI < 4.5 \qquad (7)$$

In a configuration in which the second lens group includes one or more negative lenses, it is preferable that among the negative lenses in the second lens group, an Ln lens having a strongest refractive power is located closer to the object side than the Lp lens. In this case, assuming that a focal length of the Lp lens is f2p and a focal length of the Ln lens is f2n, it is preferable that the imaging lens of the above-mentioned aspect satisfies Conditional Expression (8).

$$-2 < f2p/f2n < -0.4 \qquad (8)$$

Assuming that a sum of Bf and a distance on the optical axis from the stop to the lens surface closest to the image side in the third lens group in a state in which the infinite distance object is in focus is StI, and a sum of Bf and a distance on an optical axis from a lens surface closest to the object side in the first lens group to a lens surface closest to the image side in the third lens group in a state in which the infinite distance object is in focus is TTL, it is preferable that the imaging lens of the above-mentioned aspect satisfies Conditional Expression (9).

$$0.3 < StI/TTL < 0.85 \qquad (9)$$

Assuming that a lateral magnification of the focus group in a state in which the infinite distance object is in focus is $\beta f$, a lateral magnification of the third lens group in a state in which the infinite distance object is in focus is $\beta 3$, a focal length of the focus group is ff, a distance from the image plane to an exit pupil position in a state in which the infinite distance object is in focus is De, a sign of De is positive in a case where the exit pupil position is closer to the object side than the image plane and is negative in a case where the exit pupil position is closer to the image side than the image plane, and $\gamma=(1-\beta f^2)\times\beta 3^2$, it is preferable that the imaging lens of the above-mentioned aspect satisfies Conditional Expression (10).

$$0 < |\{\beta f/(ff\times\gamma)-1/(\beta 3\times f3)-(1/De)\}\times Y\max| < 0.15 \qquad (10)$$

It is preferable that the focus group includes one or more cemented lenses each including one or more positive lenses and one or more negative lenses.

It is preferable that the second lens group includes one or more air lenses formed by two concave lens surfaces facing toward each other. Assuming that a curvature radius of an object side surface of at least one of the air lenses of the second lens group is Raf and a curvature radius of an image side surface thereof is Rar, it is preferable that the imaging lens of the above-mentioned aspect satisfies Conditional Expression (11).

$$-0.4 < (Raf+Rar)/(Raf-Rar) < 0.6 \qquad (11)$$

It is preferable that a lens closest to the object side in the focus group has a convex surface facing toward the object side, and a lens closest to the image side in the focus group has a convex surface facing toward the image side.

It is preferable that the focus group includes one or more positive lenses and one or more negative lenses.

During focusing, the entire second lens group may be configured to integrally move, and the first lens group may be configured to remain stationary with respect to the image plane.

It is preferable that the first lens group includes one or more cemented lenses each including one or more positive lenses and one or more negative lenses.

A lens closest to the object side in the first lens group may be configured to be a negative lens having a concave surface facing toward the image side.

According to another aspect of the present disclosure, there is provided an imaging apparatus comprising the imaging lens of the above-mentioned aspect.

In the present specification, it should be noted that the terms "consisting of" and "consists of" mean that the lens may include not only the above-mentioned components but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the term "— group having a positive refractive power" means that the group has a positive refractive power as a whole. Similarly, the term "— group having a negative refractive power" means that the group has a negative refractive power as a whole. The terms "a lens having a positive refractive power" and "a positive lens" are synonymous. The terms "a lens having a negative refractive power" and "a negative lens" are synonymous. The terms "first lens group", "second lens group", and "third lens group" are not limited to a configuration consisting of a plurality of lenses, but may be a configuration consisting of only one lens.

A compound aspherical lens (a lens in which a spherical lens and an aspherical film formed on the spherical lens are integrally formed and function as one aspherical lens as a whole) is not regarded as cemented lenses, but the compound aspherical lens is regarded as a single lens. The sign of the refractive power, the curvature radius, and the surface shape of the lens including the aspherical surface will be used in terms of the paraxial region unless otherwise specified. Regarding the sign of the curvature radius, the sign of the curvature radius of the convex surface facing toward the object side is positive and the sign of the curvature radius of the convex surface facing toward the image side is negative.

In the present specification, the term "whole system" means an imaging lens. The "back focal length at the air conversion distance" is the air conversion distance on the optical axis from the lens surface closest to the image side in the whole system to the image plane. The "focal length" used in a conditional expression is a paraxial focal length. The values used in conditional expressions are values in a case where the d line is used as a reference in a state in which the infinite distance object is in focus.

The "d line", "C line", "F line", and "g line" described in the present specification are emission lines. In the present specification, it is assumed that the d line wavelength is 587.56 nm (nanometers), the C line wavelength is 656.27 nm (nanometers), the F line wavelength is 486.13 nm (nanometers), and the g line wavelength is 435.84 nm (nanometers).

According to the present disclosure, it is possible to provide an imaging lens which is configured to have a small size and has good optical performance, and an imaging apparatus comprising the imaging lens.

DESCRIPTION OF EMBODIMENTS

Figure 1:
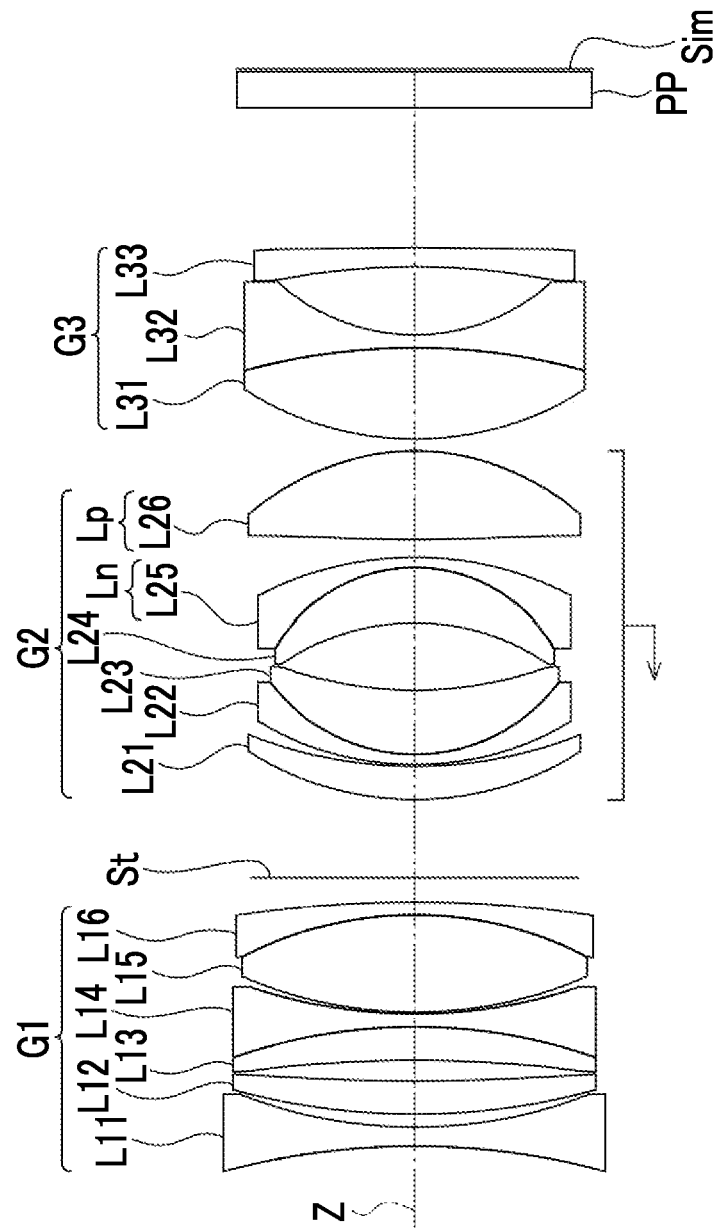
FIG. 1 is a cross-sectional view showing a configuration of an imaging lens according to an embodiment, which corresponds to the imaging lens of Example 1.
Figure 2:
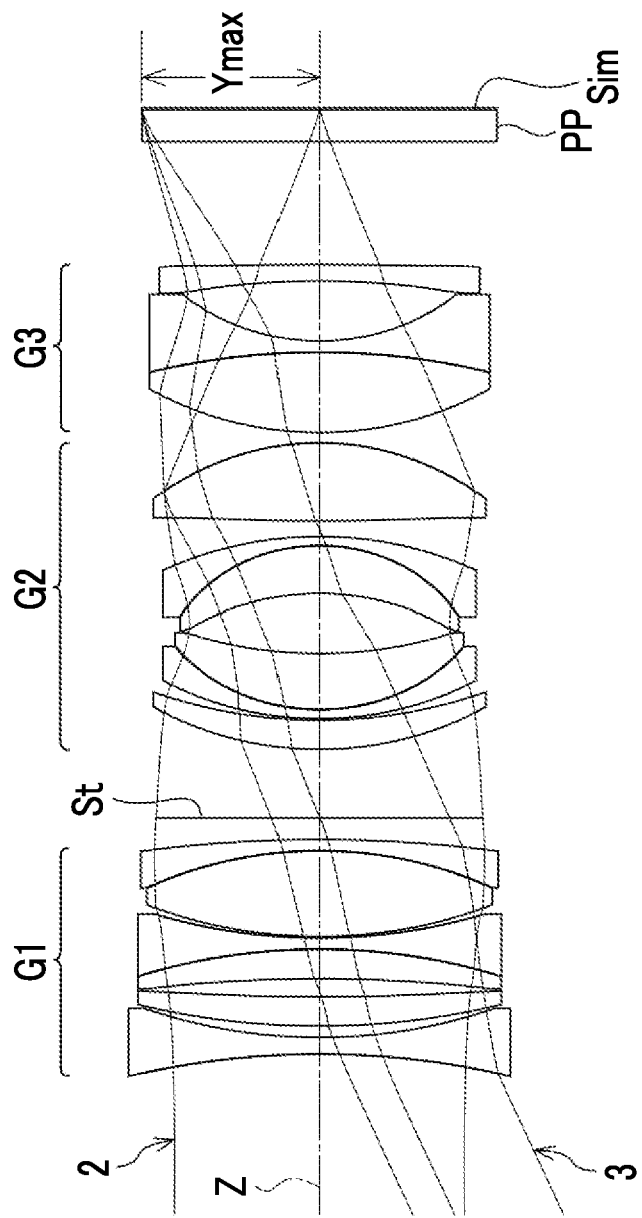
FIG. 2 is a cross-sectional view showing a configuration and luminous flux of the imaging lens of FIG. 1.

Hereinafter, embodiments of the present disclosure will be described with reference to the accompanying drawings. FIG. 1 shows a cross-sectional view of the configuration of the imaging lens according to the embodiment of the present disclosure in a state in which an infinite distance object is in focus. In the present specification, an object, of which an object distance (distance on the optical axis from the object to the lens surface closest to the object side) is at infinity, is referred to as the infinite distance object. FIG. 2 shows a cross-sectional view of a configuration and luminous flux of the imaging lens of FIG. 1 in a state in which the infinite distance object is in focus. FIG. 2 shows, as the luminous flux, the on-axis luminous flux 2 and the luminous flux 3 with the maximum image height Ymax. The examples shown in FIGS. 1 and 2 correspond to the imaging lens of Example 1 described later. In FIGS. 1 and 2, the left side is the object side and the right side is the image side. Hereinafter, the imaging lens according to the embodiment of the present disclosure will be described mainly with reference to FIG. 1.

FIG. 1 shows an example in which, assuming that an imaging lens is applied to an imaging apparatus, an optical member PP having a parallel plate shape is disposed between the imaging lens and the image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The imaging lens of FIG. 1 consists of, in order from the object side to the image side along an optical axis Z, a first lens group G1 having a positive refractive power, an aperture stop St, a second lens group G2 having a positive refractive power, and a third lens group G3. By setting the first lens group G1 closer to the object side than the aperture stop St as a group having a positive refractive power, it is possible to suppress an increase in diameter of the aperture stop St. By forming the second lens group G2 as a group having a positive refractive power in succession to the first lens group G1, it is easy to suppress the total length of the optical system.

For example, the imaging lens of FIG. 1 is configured as follows. The first lens group G1 consists of six lenses L11 to L16 in order from the object side to the image side. The second lens group G2 consists of six lenses L21 to L26 in order from the object side to the image side. The third lens group G3 consists of three lenses L31 to L33 in order from the object side to the image side. The aperture stop St of FIG. 1 does not indicate a size and a shape, but indicates a position in the optical axis direction. The method of showing the aperture stop St is the same as that in FIG. 2.

In the imaging lens of the present disclosure, during focusing, the entire first lens group G1, the aperture stop St, and the second lens group G2, or the entire second lens group G2 integrally move as a focus group, and the third lens group G3 remains stationary with respect to the image plane Sim. In the present specification, the group that moves during focusing is referred to as a "focus group". Focusing is performed by moving the focus group. The term "integrally move" means to move the same amount in the same direction at the same time. The imaging lens of the present disclosure is configured such that not the whole optical system moves but only a part of the optical system moves during focusing. Therefore, an increase in weight of the focus group can be suppressed. As a result, there is an advantage in achieving high-speed focusing. Further, by moving the entire focus group integrally, the focusing mechanism can be simplified as compared with a floating focus type imaging lens.

For example, FIG. 1 shows an example in which the entire second lens group G2 integrally moves during focusing, and the first lens group G1, the aperture stop St, and the third lens group G3 remain stationary with respect to the image plane Sim. That is, in the example of FIG. 1, the focus group consists of only the second lens group G2. The arrow pointing to the left below the second lens group G2 in FIG. 1 indicates that the second lens group G2 is a focus group moving toward the object side during focusing from the infinite distance object to an extremely short range object. By adopting a configuration in which the first lens group G1 remains stationary during focusing, a lens configuration suitable for a dust-proof and drip-proof structure is obtained.

Hereinafter, preferable configurations and possible configurations of the imaging lens of the present disclosure will be described. It should be noted that, in the following description of preferable configurations and possible configurations, the "imaging lens of the present disclosure" is also simply referred to as an "imaging lens" in order to avoid redundancy.

It is preferable that a lens closest to the object side in the focus group has a convex surface facing toward the object side, and a lens closest to the image side in the focus group has a convex surface facing toward the image side. In such a case, it is easy to suppress fluctuations in various aberrations due to focusing.

It is preferable that the focus group includes one or more positive lenses and one or more negative lenses. In such a case, there is an advantage in suppressing fluctuation in chromatic aberration due to focusing.

It is preferable that the focus group includes one or more cemented lenses each including one or more positive lenses and one or more negative lenses. In such a case, it is easy to suppress fluctuation in chromatic aberration due to focusing.

It is preferable that the first lens group G1 includes one or more cemented lenses each including one or more positive lenses and one or more negative lenses. In such a case, it is easy to suitably correct longitudinal chromatic aberration.

A lens closest to the object side in the first lens group G1 may be configured to be a negative lens having a concave surface facing toward the image side. In such a case, there is an advantage in ensuring the required angle of view.

It is preferable that the third lens group G3 includes one or more positive lenses and one or more negative lenses. In such a case, there is an advantage in suitably correcting longitudinal chromatic aberration.

Assuming that a back focal length of the whole system at the air conversion distance is Bf and a focal length of the whole system is f, it is preferable that the imaging lens satisfies Conditional Expression (1). Bf and f are values in a state in which the infinite distance object is in focus. By not allowing the corresponding value of Conditional Expression (1) to be equal to or less than the lower limit, it is possible to suppress an increase in diameter of the lens located on the image side of the aperture stop St, and it is easy to ensure the angle of view. By not allowing the corresponding value of Conditional Expression (1) to be equal to or greater than the upper limit, it is possible to suppress an increase in total length of the optical system. In order to obtain more favorable characteristics, it is more preferable that the imaging lens satisfies at least one of Conditional Expressions (1-1) to (1-5).

$$0.1 < Bf/f < 1.2 \quad (1)$$
$$0.15 < Bf/f < 1.1 \quad (1-1)$$
$$0.2 < Bf/f < 1 \quad (1-2)$$
$$0.4 < Bf/f < 1 \quad (1-3)$$
$$0.45 < Bf/f < 0.95 \quad (1-4)$$
$$0.5 < Bf/f < 0.9 \quad (1-5)$$

Assuming that a sum of the distance on the optical axis from the lens surface closest to the object side in the first lens group G1 to the lens surface closest to the image side in the third lens group G3 and Bf is TTL, the open F number is FNo, and the maximum image height is Ymax, it is preferable that the imaging lens satisfies Conditional Expression (2). Bf is a back focal length of the whole system in the air conversion distance. Bf, TTL, and FNo are values in a state in which the infinite distance object is in focus. By not allowing the corresponding value of Conditional Expression (2) to be equal to or less than the lower limit, excessive reduction in size can be prevented. As a result, there is an advantage in correcting various aberrations. By not allowing the corresponding value of Conditional Expression (2) to be equal to or greater than the upper limit, it is possible to suppress an increase in size of the whole optical system. In order to obtain more favorable characteristics, it is more preferable that the imaging lens satisfies Conditional Expression (2-1), and it is yet more preferable that the imaging lens satisfies Conditional Expression (2-2).

$$5 < TTL \times FNo/Ymax < 9.2 \quad (2)$$
$$5.5 < TTL \times FNo/Ymax < 9.2 \quad (2-1)$$
$$6 < TTL \times FNo/Ymax < 9.2 \quad (2-2)$$

Assuming that a focal length of the whole system in a state in which the infinite distance object is in focus is f and a focal length of the second lens group G2 is f2, it is preferable that the imaging lens satisfies Conditional Expression (3). By not allowing the corresponding value of Conditional Expression (3) to be equal to or less than the lower limit, the positive refractive power of the second lens group G2 is prevented from becoming excessively weak. Therefore, it is possible to suppress an increase in total length of the optical system. By not allowing the corresponding value of Conditional Expression (3) to be equal to or greater than the upper limit, the positive refractive power of the second lens group G2 is prevented from becoming excessively strong. As a result, there is an advantage in suppressing spherical aberration and astigmatism. In order to obtain more favorable characteristics, it is more preferable that the imaging lens satisfies Conditional Expression (3-1), and it is yet more preferable that the imaging lens satisfies Conditional Expression (3-2).

$$0.2 < f/f2 < 2 \quad (3)$$

$$0.4 < f/f2 < 1.8 \quad (3\text{-}1)$$

$$0.5 < f/f2 < 1.5 \quad (3\text{-}2)$$

Assuming that a focal length of the whole system in a state in which the infinite distance object is in focus is f and a focal length of the third lens group G3 is f3, it is preferable that the imaging lens satisfies Conditional Expression (4). By not allowing the corresponding value of Conditional Expression (4) to be equal to or less than the lower limit, the positive refractive power of the first lens group G1 or the second lens group G2 is prevented from becoming excessively strong. As a result, there is an advantage in suppressing spherical aberration. By not allowing the corresponding value of Conditional Expression (4) to be equal to or greater than the upper limit, the Petzval sum is prevented from becoming excessively large. As a result, there is an advantage in suppressing field curvature. In order to obtain more favorable characteristics, it is more preferable that the imaging lens satisfies Conditional Expression (4-1), and it is yet more preferable that the imaging lens satisfies Conditional Expression (4-2).

$$-0.5 < f/f3 < -0.05 \quad (4)$$

$$-0.45 < f/f3 < -0.07 \quad (4\text{-}1)$$

$$-0.4 < f/f3 < -0.1 \quad (4\text{-}2)$$

Assuming that a focal length of the first lens group G1 is f1 and a focal length of the second lens group G2 is f2, it is preferable that the imaging lens satisfies Conditional Expression (5). By not allowing the corresponding value of Conditional Expression (5) to be equal to or less than the lower limit, the refractive power of the second lens group G2 with respect to the first lens group G1 is prevented from becoming excessively weak. Therefore, it is easy to suppress field curvature. By not allowing the corresponding value of Conditional Expression (5) to be equal to or greater than the upper limit, the refractive power of the second lens group G2 with respect to the first lens group G1 is prevented from becoming excessively strong. As a result, there is an advantage in suppressing astigmatism which occurs in the second lens group G2. In order to obtain more favorable characteristics, it is more preferable that the imaging lens satisfies Conditional Expression (5-1), and it is yet more preferable that the imaging lens satisfies Conditional Expression (5-2).

$$1 < f1/f2 < 3.5 \quad (5)$$

$$1.2 < f1/f2 < 3 \quad (5\text{-}1)$$

$$1.4 < f1/f2 < 2.5 \quad (5\text{-}2)$$

Among the positive lenses in the second lens group G2, the positive lens having the strongest refractive power will be referred to as an Lp lens Lp. The Lp lens Lp is preferably shaped such that the convex surface faces toward the image side. In such a case, there is an advantage in satisfactorily correcting various aberrations with respect to the off-axis luminous flux, and there is an advantage in suppressing reduction in amount of peripheral light. In the example of FIG. 1, the lens L26 corresponds to the Lp lens Lp.

Assuming that a focal length of the second lens group G2 is f2 and a focal length of the Lp lens Lp is f2p, it is preferable that the imaging lens satisfies Conditional Expression (6). By not allowing the corresponding value of Conditional Expression (6) to be equal to or less than the lower limit, there is an advantage in correcting various aberrations, particularly astigmatism, with respect to the off-axis luminous flux, and there is also an advantage in suppressing reduction in amount of peripheral light. By not allowing the corresponding value of Conditional Expression (6) to be equal to or greater than the upper limit, the refractive power of the Lp lens Lp is prevented from becoming remarkably and excessively strong in the second lens group G2. As a result, it is easy to correct various aberrations in the second lens group G2. In order to obtain more favorable characteristics, it is more preferable that the imaging lens satisfies Conditional Expression (6-1), and it is yet more preferable that the imaging lens satisfies Conditional Expression (6-2).

$$0.9 < f2/f2p < 3.5 \quad (6)$$

$$1.1 < f2/f2p < 3 \quad (6\text{-}1)$$

$$1.3 < f2/f2p < 2.5 \quad (6\text{-}2)$$

Assuming that a sum of Bf and a distance on the optical axis from the aperture stop St to the lens surface closest to the image side in the third lens group G3 is StI, and a sum of Bf and a distance on the optical axis from the image side surface of the Lp lens Lp to the lens surface closest to the image side in the third lens group G3 is LpTI, it is preferable that the imaging lens satisfies Conditional Expression (7). Bf is a back focal length of the whole system in the air conversion distance. Bf, StI, and LpTI are values in a state in which the infinite distance object is in focus. By not allowing the corresponding value of Conditional Expression (7) to be equal to or less than the lower limit, it is possible to prevent the Lp lens Lp from being relatively disposed on the object side. Therefore, the refractive power of the Lp lens Lp acting on the off-axis luminous flux is prevented from becoming excessively weak. As a result, it is possible to suppress an increase in incidence angle of the principal ray of the off-axis luminous flux incident on the image plane Sim. As a result, there is an advantage in suppressing reduction in amount of peripheral light. By not allowing the corresponding value of Conditional Expression (7) to be equal to or greater than the upper limit, the refractive power of the Lp lens Lp acting on the off-axis luminous flux is prevented from becoming excessively strong. Therefore, it is easy to correct various aberrations in the second lens group G2. In order to obtain more favorable characteristics, it is more preferable that the imaging lens satisfies Conditional Expression (7-1), and it is yet more preferable that the imaging lens satisfies Conditional Expression (7-2).

$$1 < StI/LpTI < 4.5 \quad (7)$$

$$1.6 < StI/LpTI < 4 \quad (7\text{-}1)$$

$$1.8 < StI/LpTI < 3.5 \quad (7\text{-}2)$$

It is preferable that the second lens group G2 includes one or more positive lenses and one or more negative lenses. In such a case, there is an advantage in suppressing fluctuation in chromatic aberration due to focusing. Among the negative lenses in the second lens group G2, the negative lens having the strongest refractive power will be referred to as an Ln lens Ln. It is preferable that the Ln lens Ln is located closer to the object side than the Lp lens Lp. The Ln lens Ln has a role of separating the on-axis luminous flux 2 and the off-axis luminous flux. By disposing the Lp lens Lp on the image side of the Ln lens Ln, it is possible to suppress an increase in incidence angle of the principal ray of the off-axis luminous flux incident on the image plane Sim. As a result, there is an advantage in suppressing the reduction in amount of peripheral light. In the example of FIG. 1, the lens L25 corresponds to the Ln lens Ln.

Assuming that a focal length of the Lp lens Lp is f2p and a focal length of the Ln lens Ln is f2n, it is preferable that the imaging lens satisfies Conditional Expression (8). By not allowing the corresponding value of Conditional Expression (8) to be equal to or less than the lower limit, the refractive power of the Ln lens Ln with respect to the Lp lens Lp is prevented from becoming excessively weak. Therefore, the action of separating the on-axis luminous flux 2 and the off-axis luminous flux can be effectively obtained. Thereby, it is easy to achieve reduction in total length of the optical system. By not allowing the corresponding value of Conditional Expression (8) to be equal to or greater than the upper limit, the refractive power of the Ln lens Ln with respect to the Lp lens Lp is prevented from becoming excessively strong. Therefore, there is an advantage in suppressing various aberrations of the off-axis luminous flux occurring in a case where the on-axis luminous flux 2 and the off-axis luminous flux are separated. In order to obtain more favorable characteristics, it is more preferable that the imaging lens satisfies Conditional Expression (8-1), and it is yet more preferable that the imaging lens satisfies Conditional Expression (8-2).

$$-2 < f2p/f2n < -0.4 \quad (8)$$

$$-1.75 < f2p/f2n < -0.45 \quad (8\text{-}1)$$

$$-1.5 < f2p/f2n < -0.5 \quad (8\text{-}2)$$

Assuming that a sum of Bf and a distance on the optical axis from the aperture stop St to the lens surface closest to the image side in the third lens group G3 is StI, and a sum of Bf and a distance on the optical axis from the lens surface closest to the object side in the first lens group G1 to a lens surface closest to the image side in the third lens group G3 is TTL, it is preferable that the imaging lens satisfies Conditional Expression (9). Bf is a back focal length of the whole system in the air conversion distance. Bf, StI, and TTL are values in a state in which the infinite distance object is in focus. By not allowing the corresponding value of Conditional Expression (9) to be equal to or less than the lower limit, the position of the aperture stop St is prevented from coming excessively close to the image plane Sim. Therefore, it is possible to prevent an incidence angle of the principal ray of the off-axis luminous flux, which is incident on the imaging element disposed on the image plane Sim, from becoming excessively large. By not allowing the corresponding value of Conditional Expression (9) to be equal to or greater than the upper limit, a sufficient space closer to the object side than the aperture stop St can be ensured. Therefore, an appropriate number of lenses can be disposed. As a result, it is possible to configure the lens without forcibly reducing the absolute value of the curvature radius of the lens. Therefore, various aberrations can be suitably corrected. In order to obtain more favorable characteristics, it is more preferable that the imaging lens satisfies Conditional Expression (9-1), and it is yet more preferable that the imaging lens satisfies Conditional Expression (9-2).

$$0.3 < StI/TTL < 0.85 \quad (9)$$

$$0.35 < StI/TTL < 0.8 \quad (9\text{-}1)$$

$$0.4 < StI/TTL < 0.75 \quad (9\text{-}2)$$

Assuming that a lateral magnification of the focus group is βf, a lateral magnification of the third lens group G3 is β3, a focal length of the focus group is ff, a distance from the image plane Sim to the exit pupil position is De, and γ=(1−βf²)×β3², it is preferable that the imaging lens satisfies Conditional Expression (10). βf, β3, and De are values in a state in which the infinite distance object is in focus. A sign of De is positive in a case where the exit pupil position is closer to the object side than the image plane Sim, and is negative in a case where the exit pupil position is closer to the image side than the image plane Sim. Regarding the lower limit of Conditional Expression (10), since |{(βf/(ff×γ)−1/(β3×f3)−(1/De)}×Ymax| is an absolute value, 0<{|βf/(ff×γ)−1/β3×f3)−(1/De)}×Ymax|. Conditional Expression (10) is an expression representing the rate of change in size of the image due to focusing. By not allowing the corresponding value of Conditional Expression (10) to be equal to or greater than the upper limit, it is possible to suppress an increase in breathing (change in angle of view during the focusing operation). In order to obtain more favorable characteristics, it is more preferable that the imaging lens satisfies Conditional Expression (10-1), and it is yet more preferable that the imaging lens satisfies Conditional Expression (10-2).

$$0 < |\{\beta f/(f\!f \times \gamma) - 1/(\beta 3 \times f3) - (1/De)\} \times Y\text{max}| < 0.15 \quad (10)$$

$$0 < |\{\beta f/(f\!f \times \gamma) - 1/(\beta 3 \times f3) - (1/De)\} \times Y\text{max}| < 0.13 \quad (10\text{-}1)$$

$$0 < |\{\beta f/(f\!f \times \gamma) - 1/(\beta 3 \times f3) - (1/De)\} \times Y\text{max}| < 0.1 \quad (10\text{-}2)$$

It is preferable that the second lens group G2 includes one or more biconvex air lenses formed by two concave lens surfaces facing toward each other. In the present specification, the air spacing interposed between two lens surfaces facing toward each other is regarded as a lens having a refractive index of 1, and the air spacing is referred to as an air lens. Due to the action of the two lens surfaces of the second lens group G2 having concave surfaces facing toward each other, it is easy to suitably correct spherical aberration and suppress the Petzval sum of the whole optical system. In the example of FIG. 1, a biconvex air lens is formed by an image side surface of the lens L23 and an object side surface of the lens L24.

Assuming that a curvature radius of an object side surface of at least one of the air lenses of the second lens group G2 is Raf and a curvature radius of an image side surface thereof is Rar, it is preferable that the imaging lens satisfies Conditional Expression (11). By satisfying Conditional Expression (11), the refractive power of one surface forming the air lens is prevented from being excessively strong or excessively weak with respect to the refractive power of the other surface. As a result, it is easy to suitably correct spherical aberration. In order to obtain more favorable characteristics, it is more preferable that the imaging lens satisfies Conditional Expression (11-1), and it is yet more preferable that the imaging lens satisfies Conditional Expression (11-2).

$$-0.4 < (Raf + Rar)/(Raf - Rar) < 0.6 \quad (11)$$

$$-0.3 < (Raf + Rar)/(Raf - Rar) < 0.5 \quad (11\text{-}1)$$

$$-0.25 < (Raf + Rar)/(Raf - Rar) < 0.4 \quad (11\text{-}2)$$

The example shown in FIG. 1 is an example of the imaging lens of the present disclosure. The number of lenses constituting each group of the imaging lenses of the present disclosure can be different from the number shown in the example shown in FIG. 1. Each group of imaging lenses can be configured as follows, for example.

The number of lenses included in the first lens group G1 can be four or more and eight or less. More specifically, the first lens group G1 may be configured to consist of two positive lenses and two negative lenses. The first lens group G1 may be configured to consist of three positive lenses and three negative lenses. The first lens group G1 may be configured to consist of four positive lenses and three negative lenses. The first lens group G1 may be configured to consist of four positive lenses and four negative lenses.

The number of lenses included in the second lens group G2 can be four or more and six or less. More specifically, the second lens group G2 may be configured to consist of two positive lenses and two negative lenses. The second lens group G2 may be configured to consist of three positive lenses and one negative lens. The second lens group G2 may be configured to consist of three positive lenses and two negative lenses. The second lens group G2 may be configured to consist of three positive lenses and three negative lenses. The second lens group G2 may be configured to consist of four positive lenses and two negative lenses.

The third lens group G3 may be configured to be a lens group having a negative refractive power, or may be configured to be a lens group having a positive refractive power. The number of lenses included in the third lens group G3 can be two or more and three or less. More specifically, the third lens group G3 may be configured to consist of one positive lens and one negative lens. The third lens group G3 may be configured to consist of one positive lens and two negative lenses.

The focus group may be configured to consist of a first lens group G1, an aperture stop St, and a second lens group G2.

The above-mentioned preferable configurations and available configurations including the configurations relating to the conditional expressions may be any combination, and it is preferable to optionally adopt the configurations in accordance with required specification. It should be noted that the conditional expressions that the imaging lens of the present disclosure preferably satisfies are not limited to the conditional expressions described in the form of the expression, and the lower limit and the upper limit are selected from the preferable, more preferable, and yet more preferable conditional expressions. The conditional expressions may include all conditional expressions obtained through optional combinations.

For example, a preferred embodiment of the imaging lens of the present disclosure is an imaging lens consisting of, in order from the object side to the image side, a first lens group G1 having a positive refractive power, an aperture stop St, a second lens group G2 having a positive refractive power, and a third lens group G3. The third lens group G3 includes one or more positive lenses and one or more negative lenses, during focusing, the entirety of the first lens group G1, the aperture stop St, and the second lens group G2, or the entire second lens group G2 integrally moves as a focus group, and the third lens group G3 remains stationary with respect to an image plane Sim. The imaging lens satisfies Conditional Expressions (1) and (2).

Next, examples of the imaging lens of the present disclosure will be described, with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are attached in the drawings of different examples, components do not necessarily have a common configuration.

Example 1

FIG. 1 is a cross-sectional view of a configuration of an imaging lens of Example 1, and an illustration method and a configuration thereof are as described above. Therefore, description is partially not repeated herein. The imaging lens of Example 1 consists of, in order from the object side to the image side, a first lens group G1 having a positive refractive power, an aperture stop St, a second lens group G2 having a positive refractive power, and a third lens group G3 having a negative refractive power. During focusing from the infinite distance object to the extremely short range object, the entire second lens group G2 integrally moves to the object side, and the first lens group G1, the aperture stop St, and the third lens group G3 remain stationary with respect to the image plane Sim.

Regarding the imaging lens of Example 1, Table 1 shows basic lens data, Table 2 shows specifications, Table 3 shows variable surface spacings, and Table 4 shows aspherical coefficients thereof.

Table 1 is noted as follows. The column of Sn shows surface numbers in a case where the surface closest to the object side is the first surface and the number is increased one by one toward the image side. The column of R shows a curvature radius of each surface. The column of D shows a surface spacing between each surface and the surface adjacent to the image side on the optical axis. The column of Nd shows a refractive index of each component at the d line. The column of vd shows an Abbe number of each component based on the d line.

In Table 1, the sign of the curvature radius of the convex surface facing toward the object side is positive and the sign of the curvature radius of the convex surface facing toward the image side is negative. Table 1 also shows the aperture stop St and the optical member PP. In a cell of a surface number of a surface corresponding to the aperture stop St, the surface number and a term of (St) are noted. A value at the bottom cell of D in Table 1 indicates a spacing between the image plane Sim and the surface closest to the image side in the table. In Table 1, each variable surface spacing during focusing uses the symbol DD [ ], and the object side surface number of the spacing is given in [ ] and is noted in the column of D.

Table 2 shows a focal length f of the whole system, a back focal length Bf at the air conversion distance of the whole system, an open F number FNo., a maximum total angle of view 2w, and a maximum image height Ymax. FNo of the conditional expressions and FNo. of the tables of specifications, and FNo. of the aberration diagrams to be described later are the same. (°) in the cell of 2w indicates that the unit thereof is a degree. Table 2 shows values in a state in which the infinite distance object is in focus.

In Table 3, the row of "infinity" shows variable surface spacings in a state in which the infinite distance object is in focus, and the row below it shows variable surface spacings at the object distance of the extremely short range object in a state in which the extremely short range object is in focus. For example, in Table 3, the object distance of the extremely short range object is 0.215 m (meter). Tables 1, 2 and 3 show values in a case where the d line is used as a reference.

In basic lens data, a reference sign * is attached to surface numbers of aspherical surfaces, and numerical values of the paraxial curvature radius are written into the column of the curvature radius of the aspherical surface. In Table 4, the row of Sn shows surface numbers of the aspherical surfaces, and the rows of KA and Am show numerical values of the aspherical coefficients for each aspherical surface. It should be noted that m of Am is an integer of 3 or more, and differs depending on the surface. For example, on the twentieth surface, m=3, 4, 5, . . . 12. The "E±n" (n: an integer) in numerical values of the aspherical coefficients of Table 4 indicates "×10$^{\pm n}$". KA and Am are the aspherical coefficients in the aspherical equation represented by the following expression.

$$Zd = C \times h^2 / \{1 + (1 - KA \times C^2 \times h^2)^{1/2}\} + \Sigma Am \times h^m$$

Here,

Zd is an aspherical surface depth (a length of a perpendicular from a point on an aspherical surface at height h to a plane that is perpendicular to the optical axis Z in contact with the vertex of the aspherical surface), h is a height (a distance from the optical axis Z to the lens surface), C is an inverse of the paraxial curvature radius, KA and Am are aspherical coefficients, and $\Sigma$ in the aspherical equation means the sum with respect to m.

In the data of each table, degrees are used as a unit of an angle, and millimeters (mm) are used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | vd |
|---|---|---|---|---|
| 1 | −61.0783 | 1.4998 | 1.48749 | 70.44 |
| 2 | 40.0738 | 1.0207 | | |
| 3 | 57.0617 | 2.6288 | 1.84666 | 23.78 |
| 4 | 187.6124 | 1.6312 | | |
| 5 | −107.4924 | 2.6511 | 1.77250 | 49.62 |
| 6 | −45.6880 | 1.0098 | 1.60342 | 38.01 |
| 7 | 42.9215 | 0.1301 | | |
| 8 | 35.8054 | 7.7064 | 1.72916 | 54.67 |
| 9 | −31.0707 | 1.0098 | 1.68960 | 31.14 |
| 10 | −99.7874 | 1.9454 | | |
| 11(St) | ∞ | DD[11] | | |
| 12 | 25.6337 | 2.6332 | 1.95906 | 17.47 |
| 13 | 37.1976 | 0.1298 | | |
| 14 | 25.1244 | 0.7998 | 1.84666 | 23.78 |
| 15 | 14.8237 | 5.0921 | 1.49700 | 81.61 |
| 16 | 32.8034 | 5.3277 | | |
| 17 | −19.4347 | 4.3120 | 1.48749 | 70.44 |
| 18 | −13.2142 | 0.7998 | 1.83400 | 37.21 |
| 19 | −27.8788 | 1.3870 | | |
| *20 | 133.5986 | 7.0514 | 1.61881 | 63.85 |
| *21 | −18.8329 | DD[21] | | |
| 22 | 26.1422 | 7.2225 | 1.90366 | 31.31 |
| 23 | −53.7858 | 1.0098 | 1.77047 | 29.74 |
| 24 | 16.7234 | 5.3962 | | |
| *25 | −57.3913 | 1.4998 | 1.68948 | 31.02 |
| *26 | −229.7355 | 11.0693 | | |
| 27 | ∞ | 2.8500 | 1.51680 | 64.20 |
| 28 | ∞ | 0.2072 | | |

TABLE 2

Example 1

| | |
|---|---|
| f | 33.99 |
| Bf | 13.16 |
| FNo. | 1.44 |
| 2ω(°) | 45.6 |
| Ymax | 14.45 |

TABLE 3

Example 1

| | DD[11] | DD[21] |
|---|---|---|
| Infinity | 6.1494 | 0.8949 |
| 0.215 m | 0.8895 | 6.1548 |

TABLE 4

| | Example 1 | | | |
|---|---|---|---|---|
| Sn | 20 | 21 | 25 | 26 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −9.0708939E−06 | 2.1678558E−05 | 2.8708709E−05 | −1.9300945E−05 |
| A5 | −1.0309218E−06 | −2.5301090E−07 | −9.4036580E−06 | 1.2124213E−05 |
| A6 | −1.8665340E−08 | −3.3210599E−07 | 1.0509114E−06 | −2.3089171E−06 |
| A7 | 2.0243200E−08 | 4.9855784E−08 | 5.6031718E−08 | 1.9425306E−07 |
| A8 | −2.6803937E−10 | 1.4827492E−10 | −1.3653953E−08 | 5.9979999E−09 |
| A9 | −2.0517703E−10 | −3.9192028E−10 | 8.1511001E−11 | −1.9470701E−09 |
| A10 | 9.1378789E−12 | 1.4379926E−11 | 5.4424506E−11 | 5.8446836E−11 |
| A11 | 6.4445805E−13 | 9.5175338E−13 | −9.4772101E−13 | 4.3271013E−12 |
| A12 | −3.8503252E−14 | −5.0233615E−14 | −8.2638242E−14 | −2.1225895E−13 |

Figure 3:
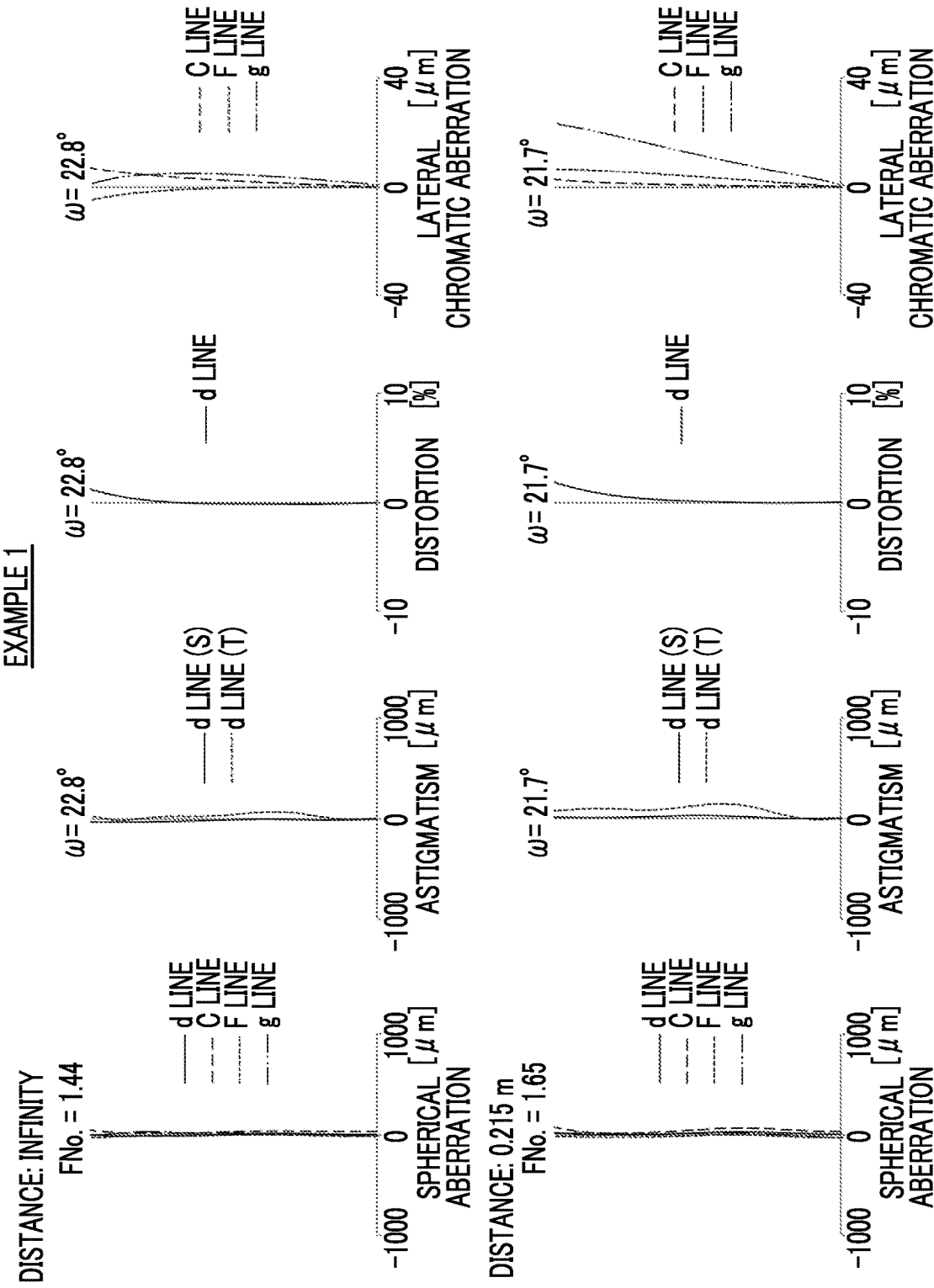
FIG. 3 is a diagram showing aberrations of the imaging lens of Example 1.

FIG. 3 shows a diagram showing aberrations of the imaging lens of Example 1. In FIG. 3, in order from the left side, spherical aberration, astigmatism, distortion, and lateral chromatic aberration are shown. FIG. 3 shows aberration diagrams in a state in which the infinite distance object is in focus in the upper part labeled "DISTANCE: INFINITY", and shows aberration diagrams in a state in which an object at an object distance of 0.215 m (meters) is in focus in the lower part labeled "DISTANCE: 0.215 m". In spherical aberration diagram, aberrations at the d line, the C line, the F line, and the g line are indicated by the solid line, the long broken line, the short broken line, and the two-dot chain line, respectively. In the astigmatism diagram, aberration in the sagittal direction at the d line is indicated by the solid line, and aberration in the tangential direction at the d line is indicated by the short broken line. In the distortion diagram, aberration at the d line is indicated by the solid line. In lateral chromatic aberration diagram, aberrations at the C line, the F line, and the g line are respectively indicated by the long broken line, the short broken line, and the two-dot chain line. In the spherical aberration diagram, the value of the open F number is shown after "FNo.=". In other aberration diagrams, the value of the maximum half angle of view is shown after "ω=".

Symbols, meanings, description methods, and illustration methods of the respective data pieces according to Example 1 are the same as those in the following examples unless otherwise specified. Therefore, in the following description, repeated description will not be given.

Example 2

Figure 4:
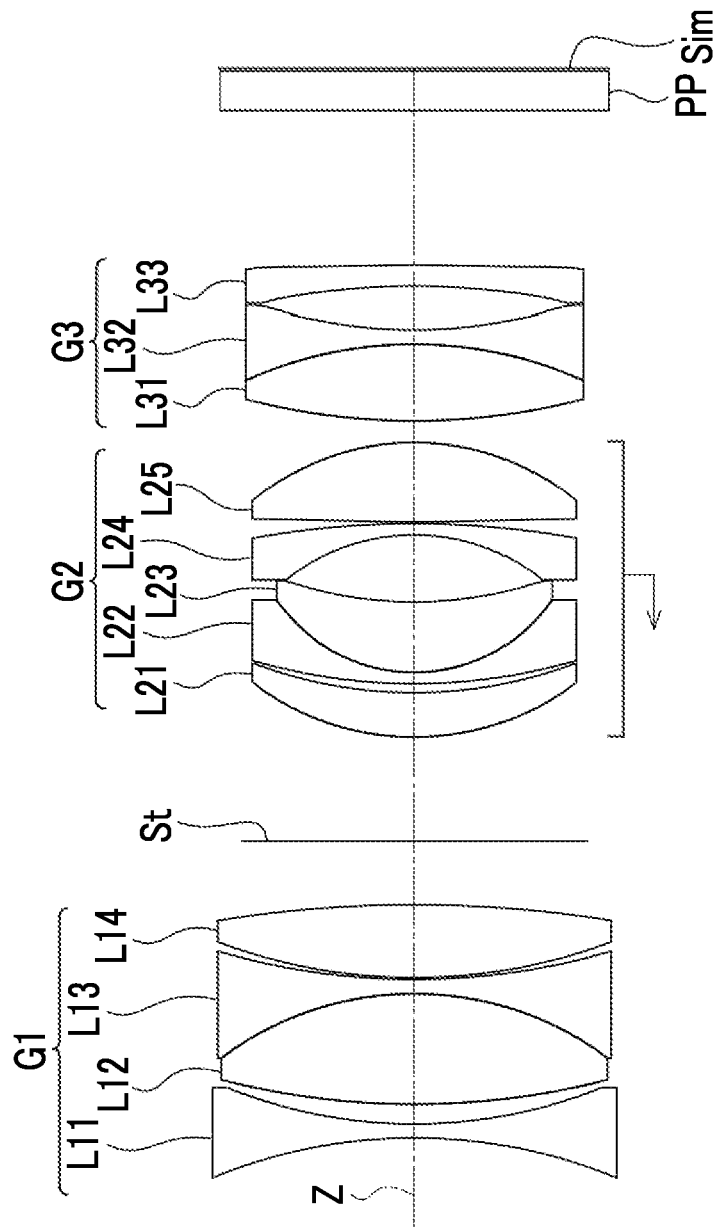
FIG. 4 is a cross-sectional view showing a configuration of an imaging lens of Example 2.

FIG. 4 is a cross-sectional view of a configuration of the imaging lens of Example 2. The imaging lens of Example 2 consists of, in order from the object side to the image side along the optical axis Z, a first lens group G1 having a positive refractive power, an aperture stop St, a second lens group G2 having a positive refractive power, and a third lens group G3 having a negative refractive power. The first lens group G1 consists of four lenses L11 to L14 in order from the object side to the image side. The second lens group G2 consists of five lenses L21 to L25 in order from the object side to the image side. The third lens group G3 consists of three lenses L31 to L33 in order from the object side to the image side. During focusing from the infinite distance object to the extremely short range object, the entire second lens group G2 integrally moves to the object side, and the first lens group G1, the aperture stop St, and the third lens group G3 remain stationary with respect to the image plane Sim.

Figure 5:
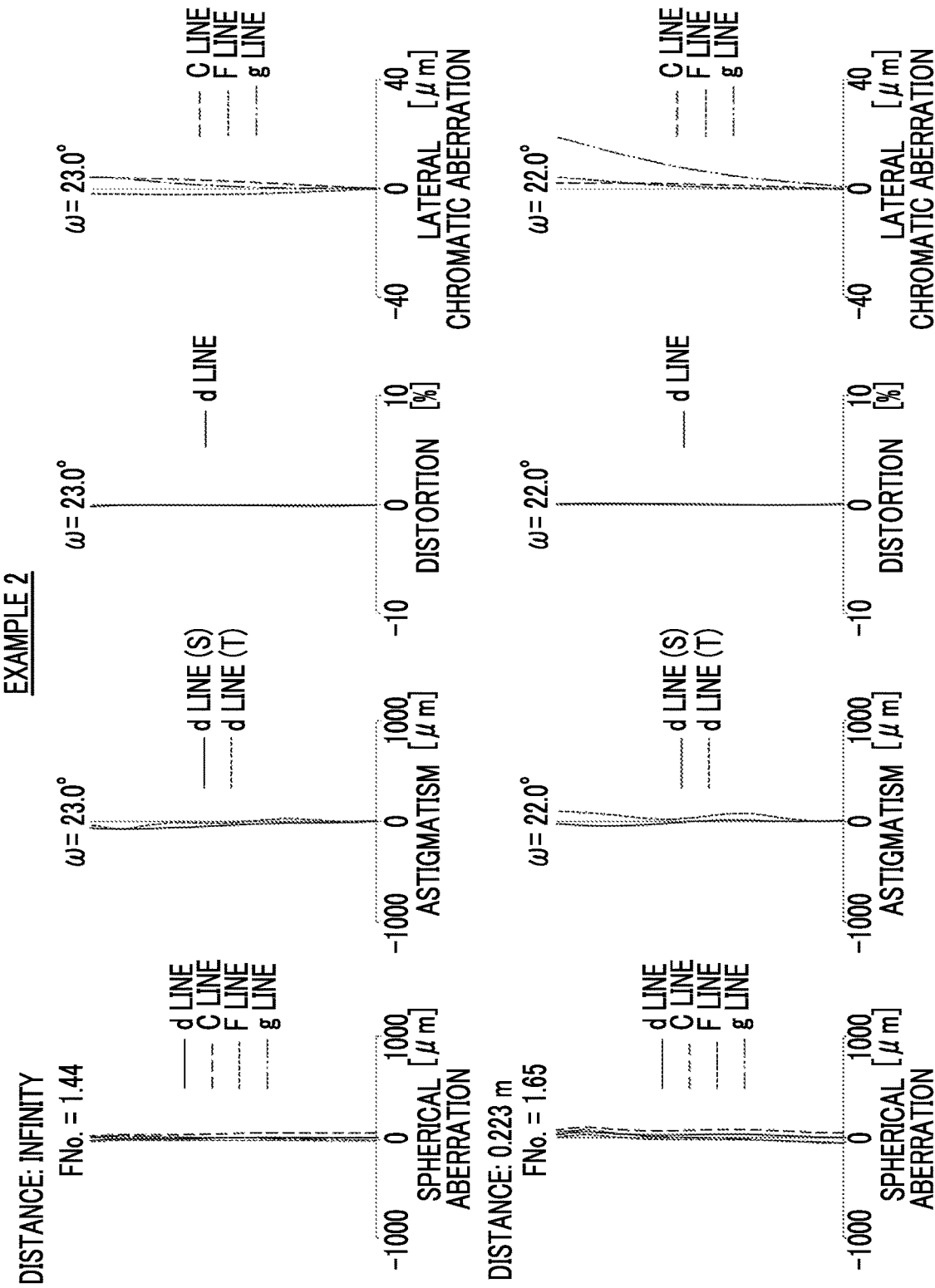
FIG. 5 is a diagram showing aberrations of the imaging lens of Example 2.

Regarding the imaging lens of Example 2, Table 5 shows basic lens data, Table 6 shows specifications, Table 7 shows variable surface spacings, Table 8 shows aspherical coefficients thereof, and FIG. 5 shows aberration diagrams.

TABLE 5

| | Example 2 | | | |
|---|---|---|---|---|
| Sn | R | D | Nd | vd |
| 1 | −40.3834 | 0.9998 | 1.48749 | 70.44 |
| 2 | 38.0997 | 1.4257 | | |
| 3 | 59.0655 | 7.9999 | 1.69680 | 55.53 |
| 4 | −24.2746 | 1.0100 | 1.62004 | 36.26 |
| 5 | 53.1211 | 0.1298 | | |
| 6 | 42.5413 | 5.1853 | 1.83481 | 42.74 |
| 7 | −93.3590 | 4.5879 | | |
| 8(St) | ∞ | DD[8] | | |
| 9 | 20.1819 | 3.2144 | 1.95906 | 17.47 |
| 10 | 34.5549 | 0.6457 | | |
| 11 | 43.6796 | 0.7998 | 1.84666 | 23.78 |
| 12 | 12.5000 | 5.1200 | 1.59282 | 68.62 |
| 13 | 30.4714 | 4.8427 | | |
| 14 | −15.4860 | 0.8000 | 1.75211 | 25.05 |
| 15 | −68.4170 | 0.1298 | | |
| *16 | 159.8143 | 5.7629 | 1.85135 | 40.10 |
| *17 | −17.9951 | DD[17] | | |
| 18 | 50.6459 | 5.5320 | 1.91082 | 35.25 |
| 19 | −31.0436 | 1.0098 | 1.73037 | 32.23 |
| 20 | 37.8861 | 3.1144 | | |
| *21 | −50.1906 | 1.5002 | 1.68948 | 31.02 |
| *22 | −148.8957 | 11.1540 | | |
| 23 | ∞ | 2.8500 | 1.51680 | 64.20 |
| 24 | ∞ | 0.2022 | | |

TABLE 6

| Example 2 | |
|---|---|
| f | 34.01 |
| Bf | 13.24 |
| FNo. | 1.44 |
| 2ω(°) | 46.0 |
| Ymax | 14.45 |

TABLE 7

| | Example 2 | |
|---|---|---|
| | DD[8] | DD[17] |
| Infinity | 7.4972 | 1.5311 |
| 0.223 m | 1.4645 | 7.5638 |

TABLE 8

Example 2

| Sn | 16 | 17 | 21 | 22 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −6.7892977E−06 | 2.6728027E−05 | 2.0699818E−05 | −2.6025700E−05 |
| A5 | −3.4998037E−06 | −3.1585103E−06 | −3.5609821E−06 | 2.0701497E−05 |
| A6 | 2.6708753E−07 | 3.6167193E−08 | 1.0411116E−06 | −3.2441813E−06 |
| A7 | 4.1719229E−08 | 5.7847224E−08 | −4.6385997E−08 | 2.0830649E−07 |
| A8 | −4.6906387E−09 | −3.6372615E−09 | −1.0004409E−08 | 8.0249345E−09 |
| A9 | −2.1393790E−10 | −3.2271859E−10 | 6.1558719E−10 | −2.2013977E−09 |
| A10 | 3.2807144E−11 | 2.9770156E−11 | 2.8180923E−11 | 7.4088106E−11 |
| A11 | 3.7083422E−13 | 6.2009046E−13 | −1.8453397E−12 | 4.8533222E−12 |
| A12 | −7.9543983E−14 | −7.1537115E−14 | −2.8600819E−14 | −2.7168254E−13 |

Example 3

Figure 6:
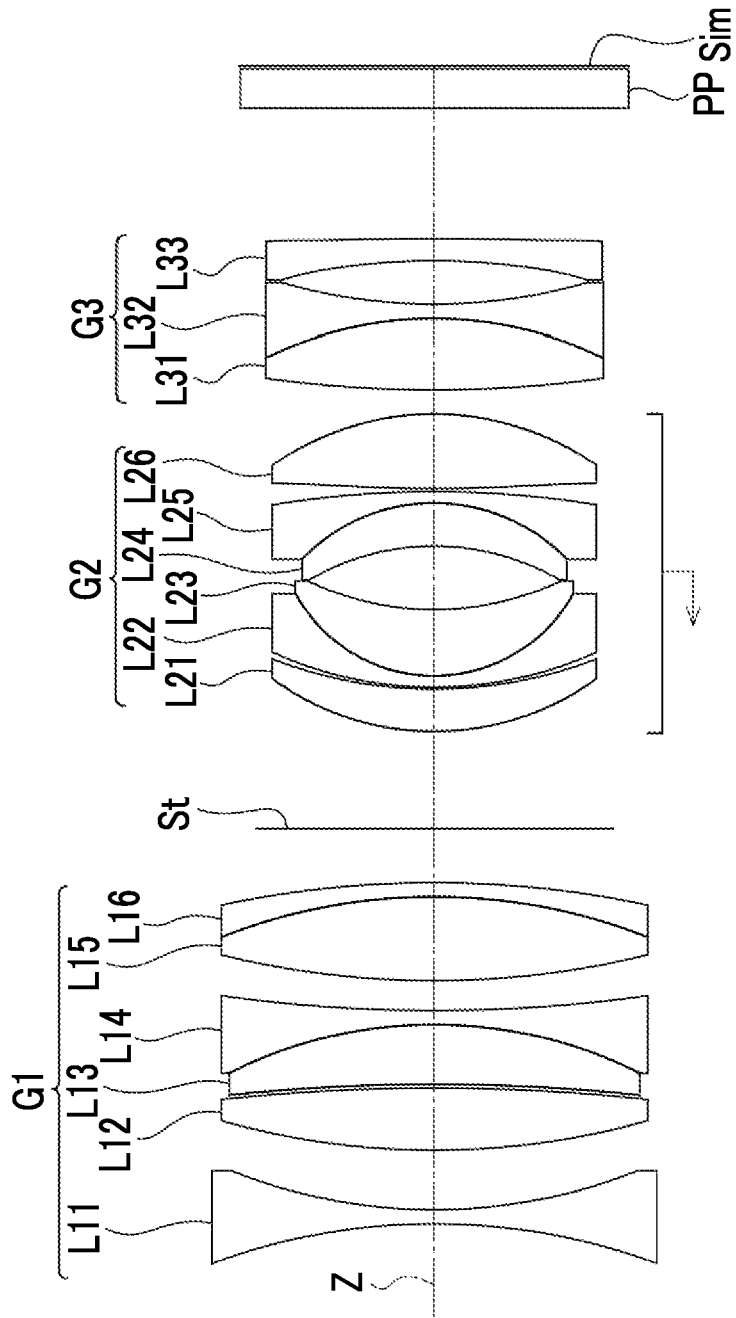
FIG. 6 is a cross-sectional view showing a configuration of an imaging lens of Example 3.
Figure 7:
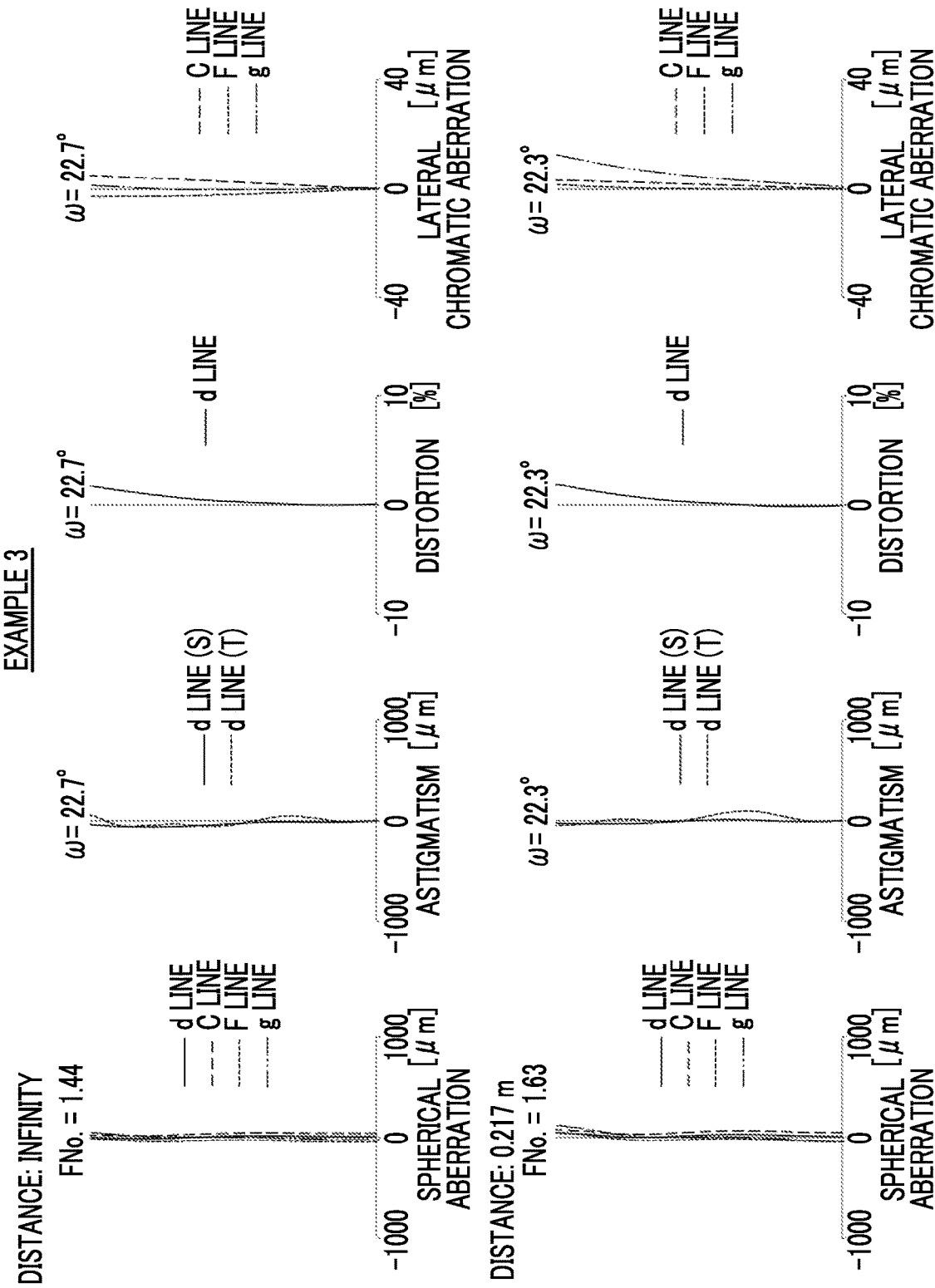
FIG. 7 is a diagram showing aberrations of the imaging lens of Example 3.

FIG. 6 is a cross-sectional view of a configuration of the imaging lens of Example 3. The imaging lens of Example 3 consists of, in order from the object side to the image side along the optical axis Z, a first lens group G1 having a positive refractive power, an aperture stop St, a second lens group G2 having a positive refractive power, and a third lens group G3 having a negative refractive power. The first lens group G1 consists of six lenses L11 to L16 in order from the object side to the image side. The second lens group G2 consists of six lenses L21 to L26 in order from the object side to the image side. The third lens group G3 consists of three lenses L31 to L33 in order from the object side to the image side. During focusing from the infinite distance object to the extremely short range object, the entire second lens group G2 integrally moves to the object side, and the first lens group G1, the aperture stop St, and the third lens group G3 remain stationary with respect to the image plane Sim. Regarding the imaging lens of Example 3, Table 9 shows basic lens data, Table 10 shows specifications, Table 11 shows variable surface spacings, Table 12 shows aspherical coefficients thereof, and FIG. 7 shows aberration diagrams.

TABLE 9

Example 3

| Sn | R | D | Nd | vd |
|---|---|---|---|---|
| 1 | −48.6592 | 1.0000 | 1.48749 | 70.42 |
| 2 | 41.5771 | 4.2900 | | |
| 3 | 59.8074 | 4.4800 | 1.83481 | 42.73 |
| 4 | −153.2429 | 0.2700 | | |
| 5 | −150.2108 | 4.3300 | 1.49700 | 81.59 |
| 6 | −34.5615 | 1.0100 | 1.59270 | 35.31 |
| 7 | 118.3516 | 2.0800 | | |
| 8 | 68.4344 | 6.0500 | 1.81600 | 46.54 |
| 9 | −44.2924 | 1.0100 | 1.78470 | 26.27 |
| 10 | −77.5628 | 3.8900 | | |
| 11 (St) | ∞ | DD[11] | | |
| 12 | 20.7479 | 3.0700 | 1.95906 | 17.47 |
| 13 | 34.4785 | 0.1300 | | |
| 14 | 29.8600 | 0.8000 | 1.84666 | 23.79 |
| 15 | 11.9120 | 4.7900 | 1.59283 | 68.63 |
| 16 | 22.1252 | 4.6000 | | |
| 17 | −18.9247 | 3.1200 | 1.49700 | 81.59 |
| 18 | −13.8596 | 0.8000 | 1.74077 | 27.76 |
| 19 | −77.3222 | 0.2300 | | |
| *20 | 116.2144 | 5.3900 | 1.85343 | 40.55 |
| *21 | −19.9974 | DD[21] | | |
| 22 | 94.5562 | 5.1200 | 1.90043 | 37.37 |
| 23 | −29.0764 | 1.0100 | 1.67300 | 38.26 |
| 24 | 41.7117 | 3.1300 | | |
| *25 | −55.6907 | 1.6000 | 1.68863 | 31.19 |
| *26 | −250.0002 | 9.4071 | | |
| 27 | ∞ | 2.8500 | 1.51680 | 64.20 |
| 28 | ∞ | 0.2010 | | |

TABLE 10

Example 3

| f | 33.93 |
|---|---|
| Bf | 11.49 |
| FNo. | 1.44 |
| 2ω(°) | 45.4 |
| Ymax | 14.45 |

TABLE 11

Example 3

| | DD[11] | DD[21] |
|---|---|---|
| Infinity | 7.0100 | 1.7100 |
| 0.217 m | 1.7684 | 6.9516 |

TABLE 12

Example 3

| Sn | 20 | 21 | 25 | 26 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −3.6981763E−06 | 2.5810155E−05 | −5.1121685E−05 | −1.2432057E−04 |
| A5 | −2.1333775E−06 | −2.3012241E−06 | −1.7390876E−06 | 4.1913962E−05 |
| A6 | −4.0513278E−08 | −2.3831105E−07 | 3.0076039E−06 | −5.5201108E−06 |

TABLE 12-continued

| | Example 3 | | | |
|---|---|---|---|---|
| Sn | 20 | 21 | 25 | 26 |
| A7 | 6.9611877E−08 | 8.5819314E−08 | −3.3080366E−07 | 2.6959548E−07 |
| A8 | −3.6341727E−09 | −2.2444614E−09 | −7.1088611E−09 | 2.1637240E−08 |
| A9 | −6.6036497E−10 | −7.8049185E−10 | 2.5409968E−09 | −3.4446746E−09 |
| A10 | 5.2747098E−11 | 4.6261020E−11 | −5.9778978E−11 | 7.9300994E−11 |
| A11 | 1.9268032E−12 | 2.2243703E−12 | −5.5852603E−12 | 8.1281733E−12 |
| A12 | −1.9346120E−13 | −1.7496157E−13 | 2.0239815E−13 | −3.8055727E−13 |

Example 4

Figure 8:
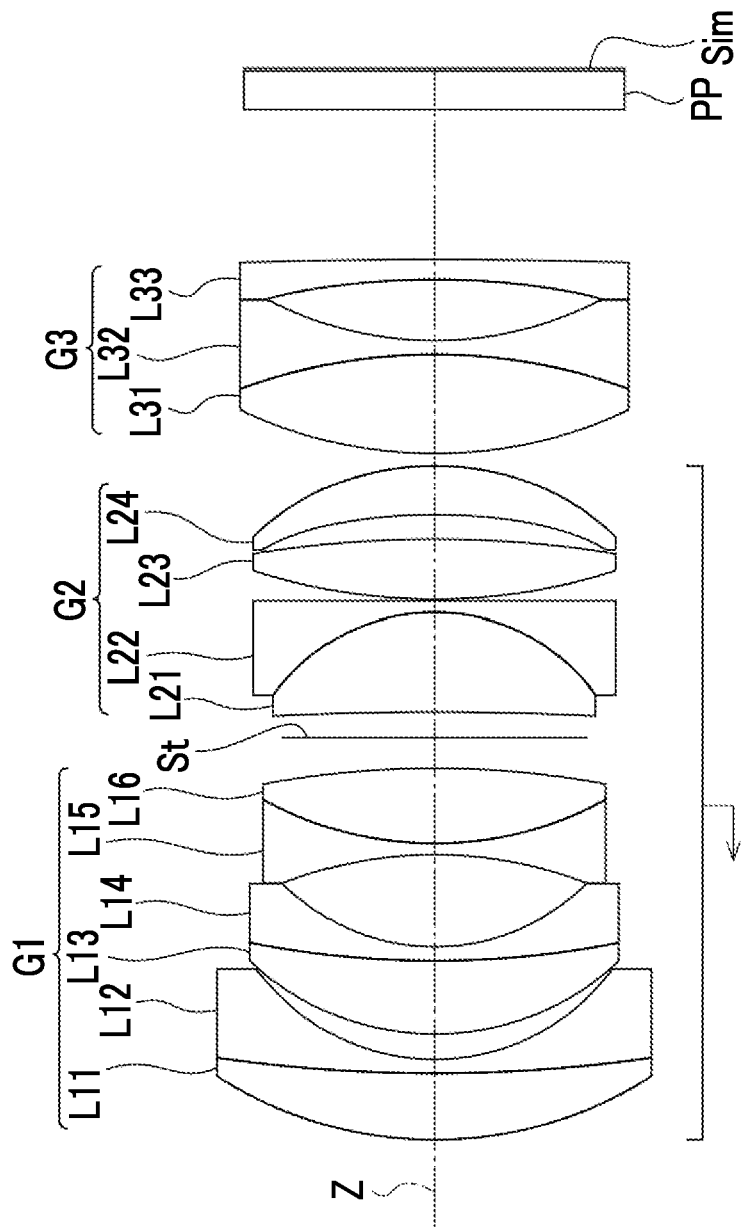
FIG. 8 is a cross-sectional view showing a configuration of an imaging lens of Example 4.

FIG. 8 is a cross-sectional view of a configuration of the imaging lens of Example 4. The imaging lens of Example 4 consists of, in order from the object side to the image side along the optical axis Z, a first lens group G1 having a positive refractive power, an aperture stop St, a second lens group G2 having a positive refractive power, and a third lens group G3 having a positive refractive power. The first lens group G1 consists of six lenses L11 to L16 in order from the object side to the image side. The second lens group G2 consists of four lenses L21 to L24 in order from the object side to the image side. The third lens group G3 consists of three lenses L31 to L33 in order from the object side to the image side. During focusing from the infinite distance object to the extremely short range object, the entire first lens group G1, the aperture stop St, and the second lens group G2 integrally move to the object side, and the third lens group G3 It remains stationary with respect to the image plane Sim.

Figure 9:
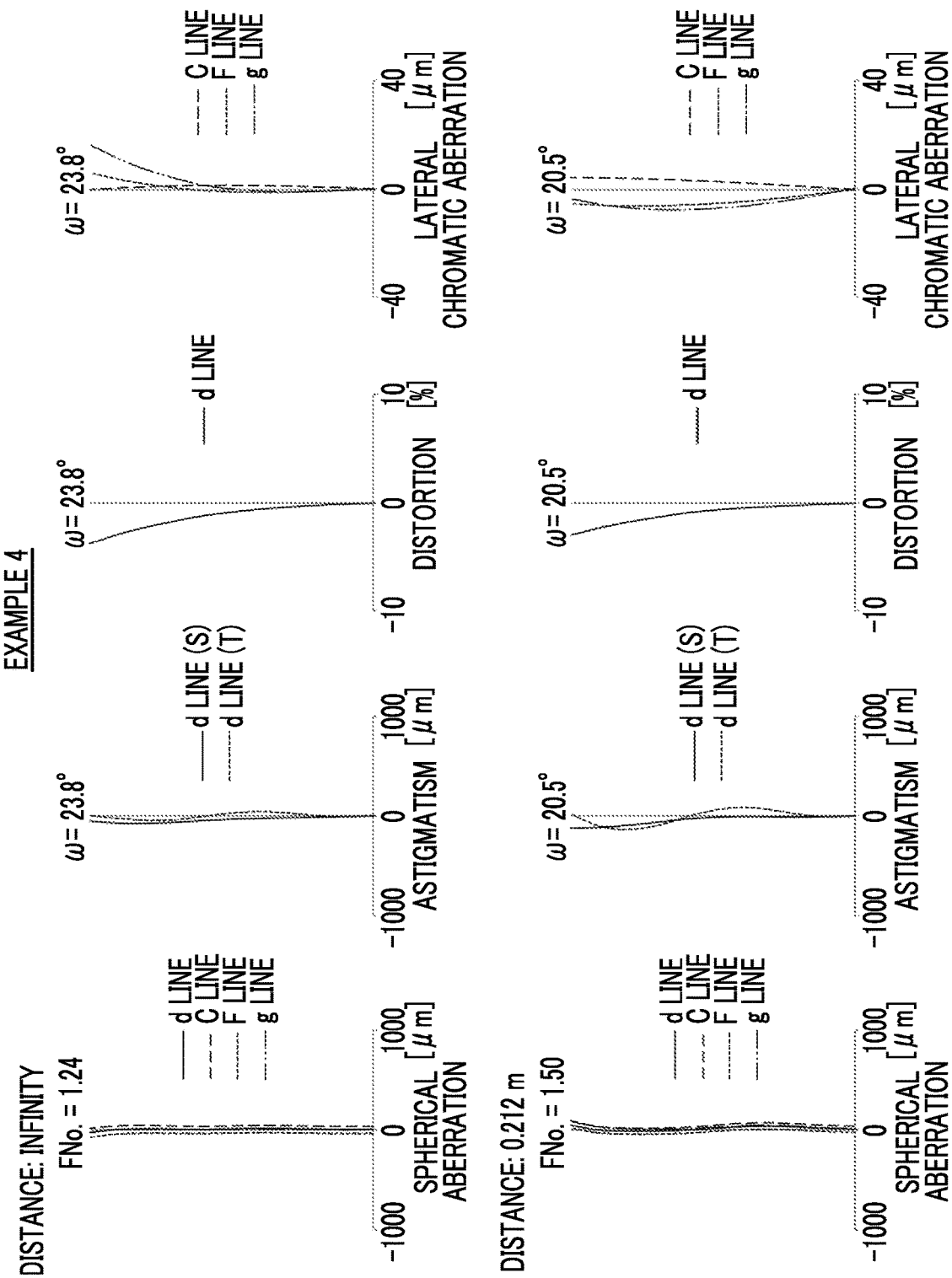
FIG. 9 is a diagram showing aberrations of the imaging lens of Example 4.

Regarding the imaging lens of Example 4, Table 13 shows basic lens data, Table 14 shows specifications, Table 15 shows variable surface spacings, Table 16 shows aspherical coefficients thereof, and FIG. 9 shows aberration diagrams.

TABLE 13

| | Example 4 | | | |
|---|---|---|---|---|
| Sn | R | D | Nd | vd |
| 1 | 31.1431 | 4.9237 | 1.83481 | 42.74 |
| 2 | 118.8649 | 1.0099 | 1.53172 | 48.84 |
| 3 | 16.9895 | 1.8709 | | |
| 4 | 20.7961 | 5.4318 | 1.83481 | 42.74 |
| 5 | 74.7910 | 1.0100 | 1.59551 | 39.24 |
| 6 | 16.4001 | 6.8462 | | |
| 7 | −32.6088 | 0.8098 | 1.60342 | 38.03 |
| 8 | 27.4835 | 5.5745 | 1.88300 | 40.80 |
| 9 | −71.4246 | 2.2714 | | |

TABLE 13-continued

| | Example 4 | | | |
|---|---|---|---|---|
| Sn | R | D | Nd | vd |
| 10(St) | ∞ | 1.8741 | | |
| 11 | −245.2123 | 7.3359 | 1.49700 | 81.54 |
| 12 | −15.3425 | 0.8002 | 1.68893 | 31.07 |
| 13 | 33569.6085 | 0.1300 | | |
| 14 | 46.1713 | 4.4245 | 1.59282 | 68.62 |
| 15 | −88.0833 | 1.7784 | | |
| *16 | −51.4502 | 3.6642 | 1.68948 | 31.02 |
| *17 | −21.5878 | DD[17] | | |
| 18 | 35.2043 | 7.3345 | 1.88300 | 40.80 |
| 19 | −43.5844 | 1.0102 | 1.62004 | 36.26 |
| 20 | 27.9800 | 4.5014 | | |
| *21 | −63.9872 | 1.5000 | 1.68948 | 31.02 |
| *22 | −250.0201 | 11.0567 | | |
| 23 | ∞ | 2.8500 | 1.51680 | 64.20 |
| 24 | ∞ | 0.2014 | | |

TABLE 14

| Example 4 | |
|---|---|
| f | 33.98 |
| Bf | 13.14 |
| FNo. | 1.24 |
| 2ω(°) | 47.6 |
| Ymax | 14.45 |

TABLE 15

| Example 4 | |
|---|---|
| | DD[17] |
| Infinity | 0.8921 |
| 0.212 m | 10.1156 |

TABLE 16

| | Example 4 | | | |
|---|---|---|---|---|
| Sn | 16 | 17 | 21 | 22 |
| KA | 1.0000000E+00 | 1.0000000E+00 | 1.0000000E+00 | 1.0000000E+00 |
| A3 | 3.9511741E−21 | 3.1609393E−20 | −3.2124509E−20 | 0.0000000E+00 |
| A4 | −5.7117326E−06 | 1.2962870E−05 | 1.2248477E−05 | −1.1813345E−05 |
| A5 | −4.5456953E−06 | −3.7193530E−06 | −7.0713729E−06 | 5.7770793E−06 |
| A6 | 2.2304719E−07 | −2.2824960E−08 | 7.1138423E−07 | −9.7948790E−07 |
| A7 | 2.8112293E−08 | 4.5283368E−08 | 4.1398567E−08 | 8.3806185E−08 |
| A8 | −3.0404465E−09 | −1.4721854E−09 | −7.0880062E−09 | 2.7402759E−09 |
| A9 | −5.6325021E−11 | −2.7108692E−10 | −1.2274984E−10 | −8.7857820E−10 |
| A10 | 1.2462696E−11 | 1.3668605E−11 | 2.8590071E−11 | 2.4554936E−11 |
| A11 | −4.6590123E−14 | 6.0298999E−13 | 1.2291720E−13 | 2.073 8404E−12 |
| A12 | −1.7137410E−14 | −3.7667538E−14 | −4.3834162E−14 | −9.3293944E−14 |

Example 5

Figure 10:
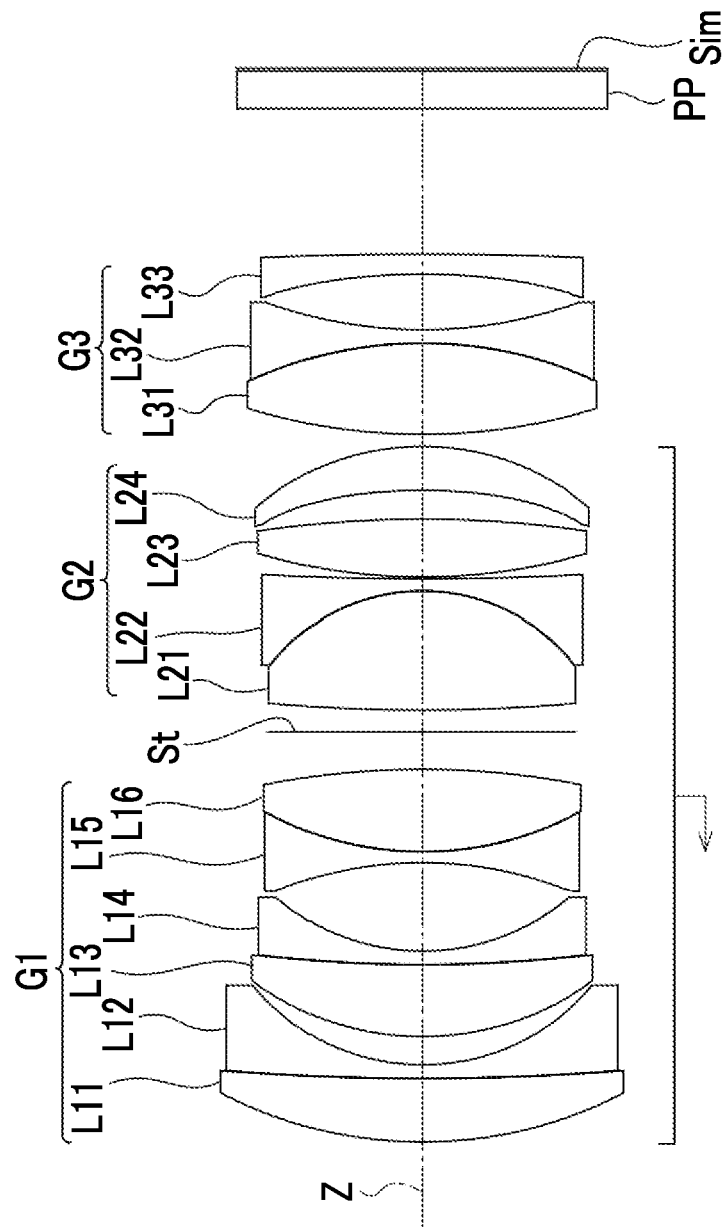
FIG. 10 is a cross-sectional view showing a configuration of an imaging lens of Example 5.

FIG. 10 is a cross-sectional view of a configuration of the imaging lens of Example 5. The imaging lens of Example 5 consists of, in order from the object side to the image side along the optical axis Z, a first lens group G1 having a positive refractive power, an aperture stop St, a second lens group G2 having a positive refractive power, and a third lens group G3 having a positive refractive power. The first lens group G1 consists of six lenses L11 to L16 in order from the object side to the image side. The second lens group G2 consists of four lenses L21 to L24 in order from the object side to the image side. The third lens group G3 consists of three lenses L31 to L33 in order from the object side to the image side. During focusing from the infinite distance object to the extremely short range object, the entire first lens group G1, the aperture stop St, and the second lens group G2 integrally move to the object side, and the third lens group G3 It remains stationary with respect to the image plane Sim.

Figure 11:
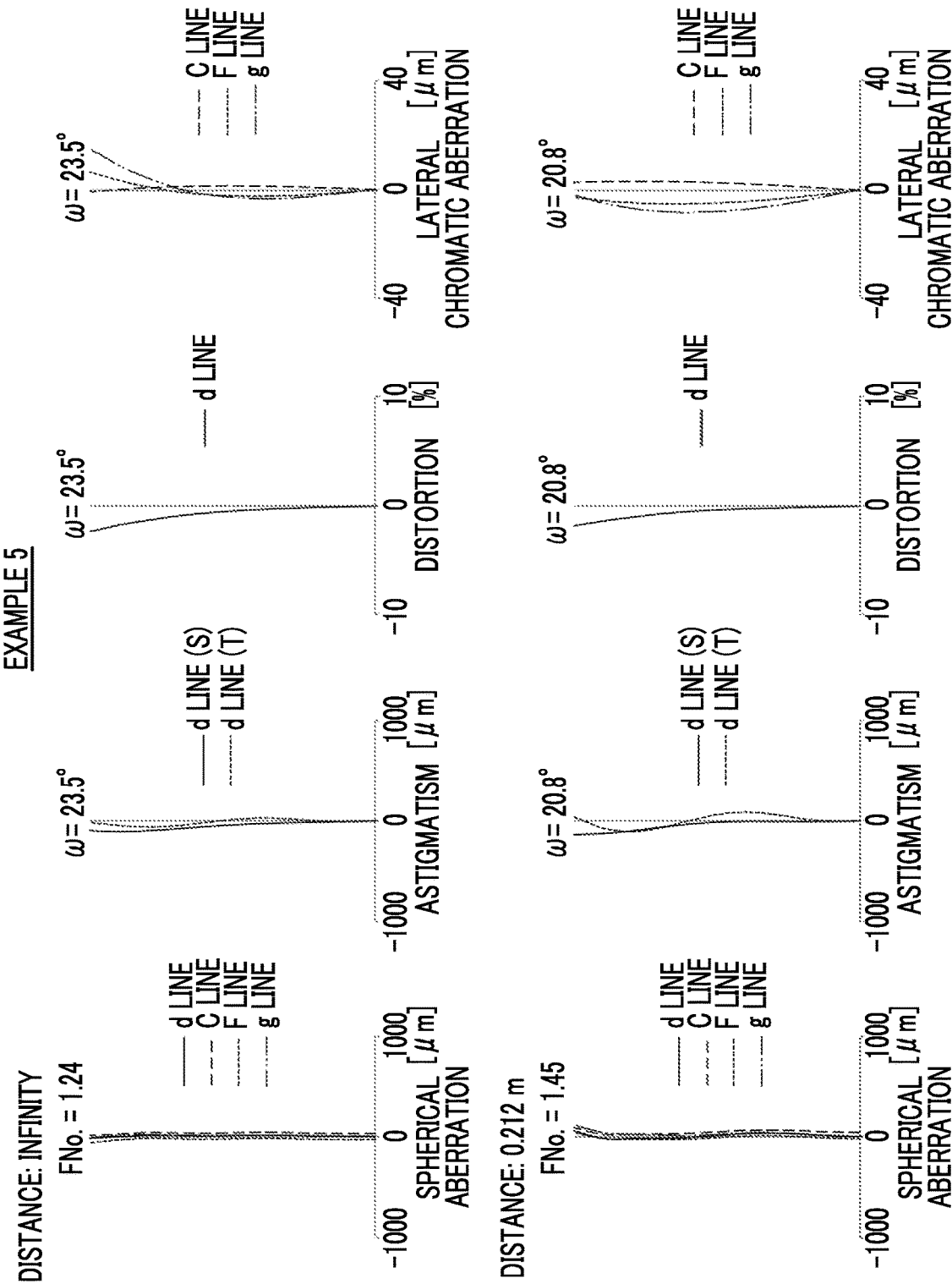
FIG. 11 is a diagram showing aberrations of the imaging lens of Example 5.

Regarding the imaging lens of Example 5, Table 17 shows basic lens data, Table 18 shows specifications, Table 19 shows variable surface spacings, Table 20 shows aspherical coefficients thereof, and FIG. 11 shows aberration diagrams.

TABLE 17

Example 5

| Sn | R | D | Nd | νd |
|---|---|---|---|---|
| 1 | 34.8421 | 4.8303 | 1.84000 | 43.87 |
| 2 | 204.6108 | 1.0098 | 1.51600 | 52.00 |
| 3 | 17.5636 | 2.1414 | | |
| 4 | 22.8123 | 5.4686 | 1.84000 | 43.53 |
| 5 | 111.6202 | 1.0098 | 1.57273 | 41.36 |
| 6 | 17.9098 | 6.7441 | | |
| 7 | −31.5926 | 0.8098 | 1.70489 | 29.75 |
| 8 | 26.1359 | 6.2612 | 1.96000 | 31.84 |
| 9 | −65.3242 | 2.8363 | | |

TABLE 17-continued

Example 5

| Sn | R | D | Nd | νd |
|---|---|---|---|---|
| 10(St) | ∞ | 1.6505 | | |
| 11 | 139.1461 | 8.9772 | 1.49700 | 81.54 |
| 12 | −15.4211 | 0.9002 | 1.68184 | 31.30 |
| 13 | 236.6583 | 0.1300 | | |
| 14 | 46.6910 | 4.3898 | 1.70153 | 56.42 |
| 15 | −91.4460 | 2.1899 | | |
| *16 | −44.1113 | 3.3489 | 1.68948 | 31.02 |
| *17 | −21.0495 | DD[17] | | |
| 18 | 47.8068 | 6.9211 | 1.96001 | 31.86 |
| 19 | −33.2242 | 1.0098 | 1.70404 | 29.80 |
| 20 | 36.8717 | 4.2220 | | |
| *21 | −49.8418 | 1.5000 | 1.68948 | 31.02 |
| *22 | −250.0090 | 11.0404 | | |
| 23 | ∞ | 2.8500 | 1.51680 | 64.20 |
| 24 | ∞ | 0.2039 | | |

TABLE 18

Example 5

| | |
|---|---|
| f | 33.99 |
| Bf | 13.12 |
| FNo. | 1.24 |
| 2ω(°) | 47.0 |
| Ymax | 14.45 |

TABLE 19

Example 5

| | DD[17] |
|---|---|
| Infinity | 0.9078 |
| 0.212 m | 8.0378 |

TABLE 20

Example 5

| Sn | 16 | 17 | 21 | 22 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −2.8312136E−06 | 2.0075599E−05 | 5.6129282E−05 | 3.5195611E−05 |
| A5 | −5.9252159E−06 | −5.1344081E−06 | −1.6058497E−05 | −5.4169122E−06 |
| A6 | 3.0611056E−07 | 5.0567913E−11 | 9.0907338E−07 | −2.7322338E−07 |
| A7 | 4.0614675E−08 | 6.5880444E−08 | 1.3085811E−07 | 1.2964787E−07 |
| A8 | −4.4295906E−09 | −2.7251646E−09 | −1.3148529E−08 | −4.6382119E−09 |
| A9 | −1.0849751E−10 | −3.8489599E−10 | −4.9945029E−10 | −8.2715646E−10 |
| A10 | 2.0999110E−11 | 2.3323881E−11 | 6.3403073E−11 | 4.6237032E−11 |
| A11 | 3.4619877E−14 | 8.2290570E−13 | 7.0070249E−13 | 1.6455950E−12 |
| A12 | −3.6577285E−14 | −6.0608780E−14 | −1.0960962E−13 | −1.0879727E−13 |

Example 6

Figure 12:
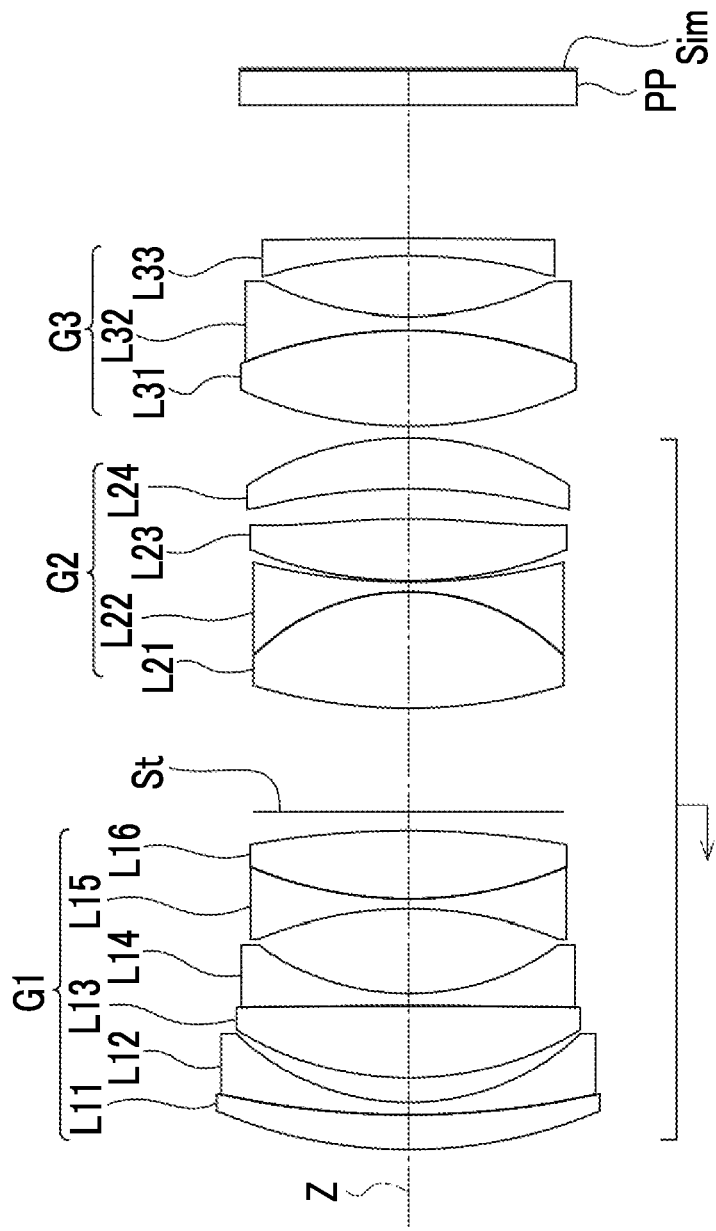
FIG. 12 is a cross-sectional view showing a configuration of an imaging lens of Example 6.

FIG. 12 is a cross-sectional view of a configuration of the imaging lens of Example 6. The imaging lens of Example 6 consists of, in order from the object side to the image side along the optical axis Z, a first lens group G1 having a positive refractive power, an aperture stop St, a second lens group G2 having a positive refractive power, and a third lens group G3 having a positive refractive power. The first lens group G1 consists of six lenses L11 to L16 in order from the object side to the image side. The second lens group G2 consists of four lenses L21 to L24 in order from the object side to the image side. The third lens group G3 consists of three lenses L31 to L33 in order from the object side to the image side. During focusing from the infinite distance object to the extremely short range object, the entire first lens group G1, the aperture stop St, and the second lens group G2 integrally move to the object side, and the third lens group G3. It remains stationary with respect to the image plane Sim.

Figure 13:
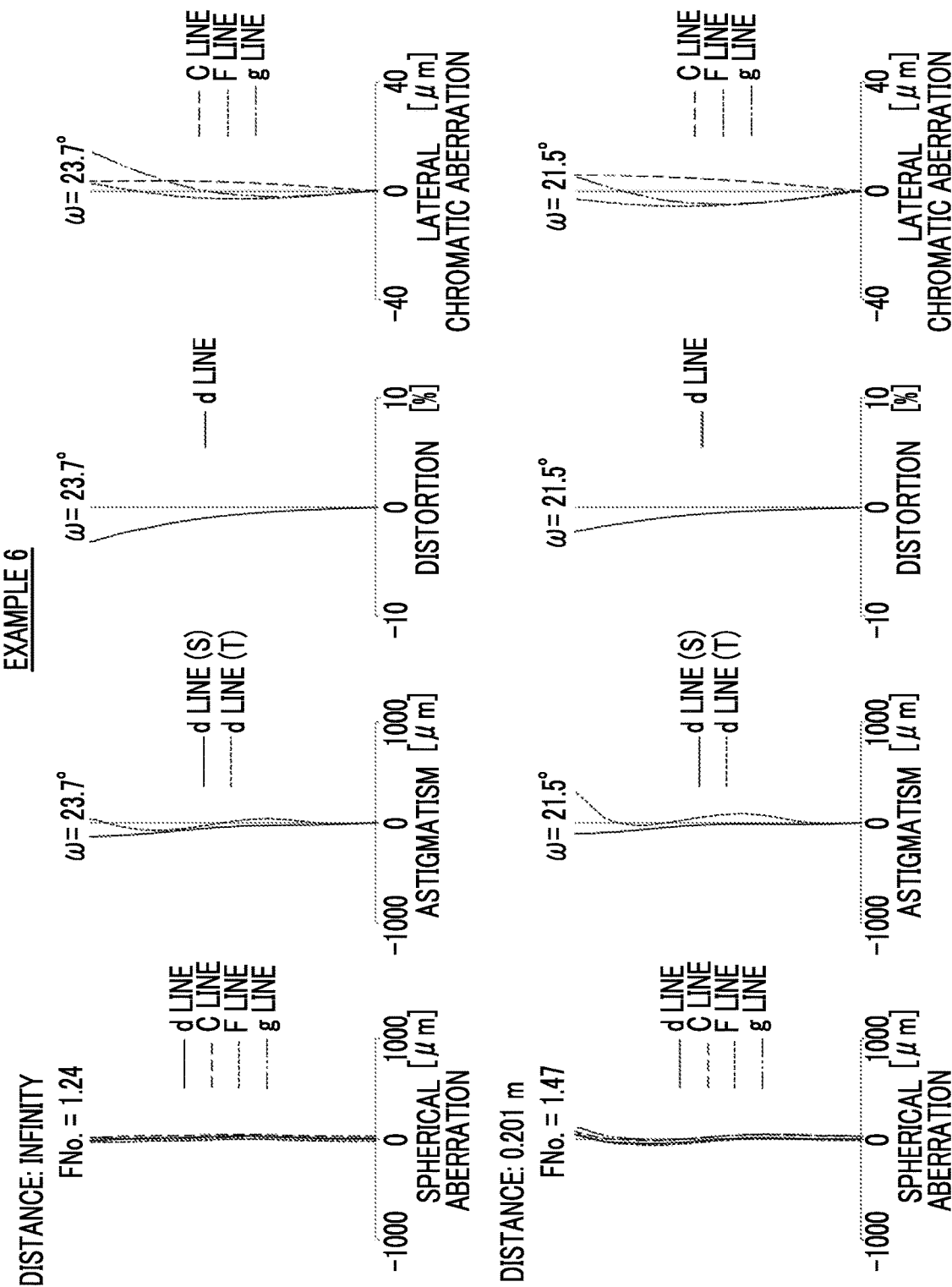
FIG. 13 is a diagram showing aberrations of the imaging lens of Example 6.

Regarding the imaging lens of Example 6, Table 21 shows basic lens data, Table 22 shows specifications, Table 23 shows variable surface spacings, Table 24 shows aspherical coefficients thereof, and FIG. 13 shows aberration diagrams.

TABLE 21

Example 6

| Sn | R | D | Nd | νd |
|---|---|---|---|---|
| 1 | 43.3197 | 2.9005 | 1.83999 | 43.83 |
| 2 | 75.9090 | 1.0101 | 1.51599 | 52.11 |
| 3 | 21.6265 | 2.0648 | | |
| 4 | 28.8652 | 6.0256 | 1.84001 | 43.76 |
| 5 | −952.3635 | 1.0100 | 1.56958 | 41.95 |
| 6 | 22.3163 | 7.0111 | | |
| 7 | −34.5010 | 0.8098 | 1.62811 | 35.19 |
| 8 | 35.4522 | 5.7173 | 1.96000 | 31.99 |
| 9 | −78.7658 | 1.6000 | | |

TABLE 21-continued

Example 6

| Sn | R | D | Nd | νd |
|---|---|---|---|---|
| 10(St) | ∞ | 8.6022 | | |
| 11 | 47.9479 | 9.7406 | 1.49700 | 81.54 |
| 12 | −19.1144 | 0.7998 | 1.70281 | 29.86 |
| 13 | 54.1485 | 0.1300 | | |
| *14 | 39.3776 | 5.1153 | 1.55332 | 71.68 |
| *15 | −72.7638 | 2.5159 | | |
| 16 | −54.1863 | 4.2890 | 1.84000 | 28.39 |
| 17 | −25.6860 | DD[17] | | |
| 18 | 35.4450 | 7.9999 | 1.94410 | 33.59 |
| 19 | −38.1024 | 1.1101 | 1.70106 | 29.95 |
| 20 | 27.5028 | 4.9998 | | |
| *21 | −48.4764 | 1.5000 | 1.68948 | 31.02 |
| *22 | −249.9795 | 11.1066 | | |
| 23 | ∞ | 2.8500 | 1.51680 | 64.20 |
| 24 | ∞ | 0.2035 | | |

TABLE 22

Example 6

| | |
|---|---|
| f | 33.98 |
| Bf | 13.19 |
| FNo. | 1.24 |
| 2ω(°) | 47.4 |
| Ymax | 14.45 |

TABLE 23

Example 6

| | DD[17] |
|---|---|
| Infinity | 0.9523 |
| 0.201 m | 9.5625 |

TABLE 24

Example 6

| Sn | 14 | 15 | 21 | 22 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 2.6667239E−07 | 1.8023346E−05 | 4.1717662E−05 | 2.8184646E−05 |
| A5 | 1.4281481E−06 | 1.6167265E−06 | −1.4258248E−05 | −3.7951107E−06 |
| A6 | −3.1920839E−07 | −3.6447151E−07 | 1.0742538E−06 | −5.6221644E−07 |
| A7 | 1.6318779E−08 | 1.6272847E−08 | 9.3170220E−08 | 1.6383238E−07 |
| A8 | 2.2276348E−09 | 2.2803799E−09 | −1.2458918E−08 | −4.0088447E−09 |
| A9 | −2.1342929E−10 | −1.6314949E−10 | −2.5237144E−10 | −1.1579934E−09 |
| A10 | −1.7717901E−12 | −4.2206589E−12 | 5.3341395E−11 | 5.8404846E−11 |
| A11 | 6.0480058E−13 | 4.0952481E−13 | 1.7505975E−13 | 2.3385988E−12 |
| A12 | −1.1784087E−14 | −6.2247436E−16 | −8.5322142E−14 | −1.4856056E−13 |

Example 7

Figure 14:
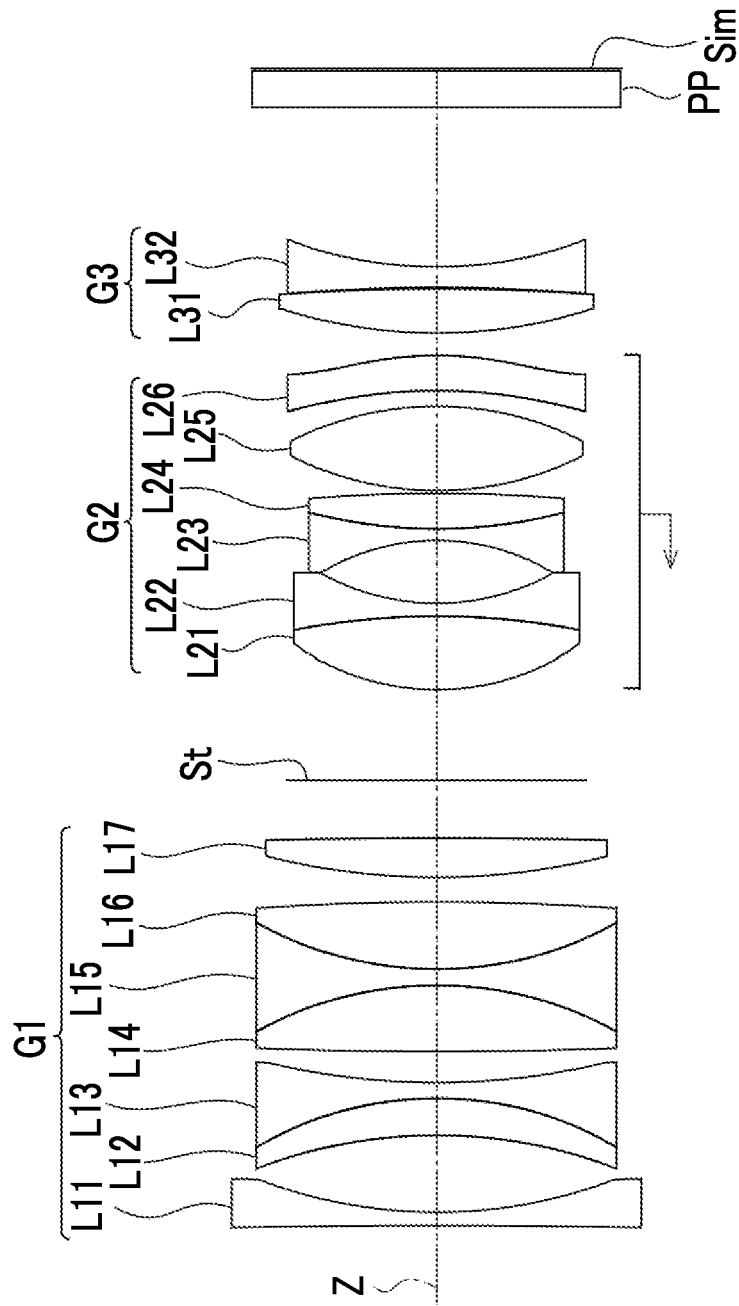
FIG. 14 is a cross-sectional view showing a configuration of an imaging lens of Example 7.

FIG. 14 is a cross-sectional view of a configuration of the imaging lens of Example 7. The imaging lens of Example 7 consists of, in order from the object side to the image side along the optical axis Z, a first lens group G1 having a positive refractive power, an aperture stop St, a second lens group G2 having a positive refractive power, and a third lens group G3 having a negative refractive power. The first lens group G1 consists of seven lenses L11 to L17 in order from the object side to the image side. The second lens group G2 consists of six lenses L21 to L26 in order from the object side to the image side. The third lens group G3 consists of two lenses L31 and L32 in order from the object side to the image side. During focusing from the infinite distance object to the extremely short range object, the entire second lens group G2 integrally moves to the object side, and the first lens group G1, the aperture stop St, and the third lens group G3 remain stationary with respect to the image plane Sim.

Figure 15:
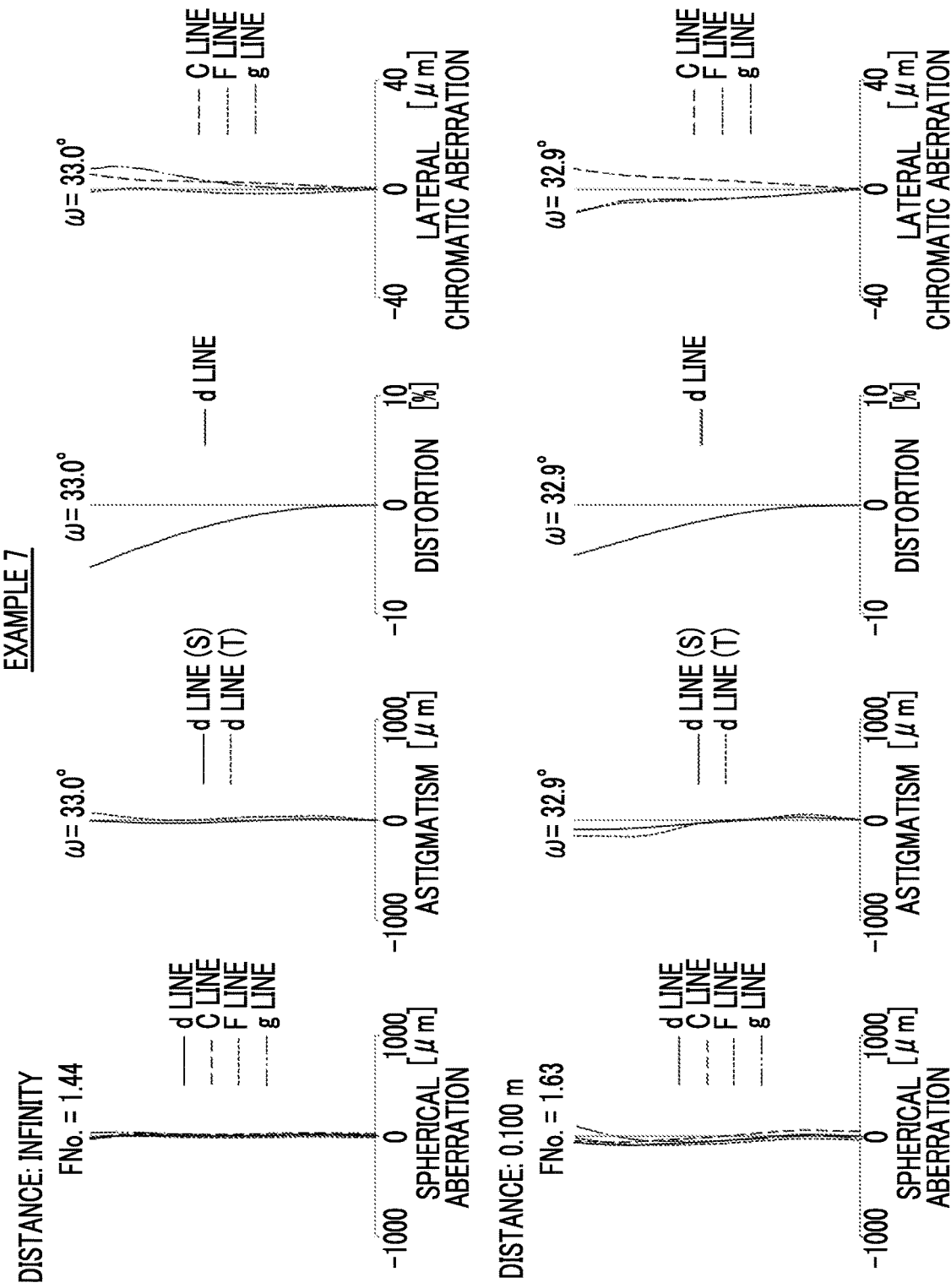
FIG. 15 is a diagram showing aberrations of the imaging lens of Example 7.

Regarding the imaging lens of Example 7, Table 25 shows basic lens data, Table 26 shows specifications, Table 27 shows variable surface spacings, Table 28 shows aspherical coefficients thereof, and FIG. 15 shows aberration diagrams.

TABLE 25

Example 7

| Sn | R | D | Nd | vd |
|---|---|---|---|---|
| 1 | −887.4776 | 1.0500 | 1.53996 | 59.73 |
| 2 | 41.1494 | 6.0700 | | |
| 3 | −41.1494 | 2.9000 | 1.88300 | 40.80 |
| 4 | −29.0764 | 1.2100 | 1.80809 | 22.76 |
| 5 | 59.9485 | 2.4300 | | |
| 6 | 383.4806 | 5.2100 | 1.88300 | 40.80 |
| 7 | −30.6142 | 1.2400 | 1.59270 | 35.31 |
| 8 | 30.6142 | 5.2800 | 1.88300 | 40.80 |
| 9 | −205.8923 | 1.9200 | | |
| 10 | 57.3331 | 3.0800 | 1.95906 | 17.47 |
| 11 | −548.6944 | 4.5300 | | |
| 12(St) | ∞ | DD[12] | | |

TABLE 25-continued

Example 7

| Sn | R | D | Nd | vd |
|---|---|---|---|---|
| 13 | 20.3442 | 5.7000 | 1.59282 | 68.62 |
| 14 | −62.1811 | 1.0100 | 1.53172 | 48.85 |
| 15 | 19.7263 | 4.9315 | | |
| 16 | −18.5053 | 0.9000 | 1.71736 | 29.51 |
| 17 | 41.4180 | 2.7800 | 1.69680 | 55.53 |
| 18 | −131.9641 | 0.2000 | | |
| 19 | 26.3178 | 6.6400 | 1.59282 | 68.62 |
| 20 | −26.3178 | 1.2100 | | |
| *21 | −47.8136 | 2.7500 | 1.80610 | 40.73 |
| *22 | −29.8762 | DD[22] | | |
| 23 | 41.9378 | 3.4700 | 1.59282 | 68.62 |
| 24 | −182.0569 | 0.1705 | | |
| *25 | −96.5919 | 1.6000 | 1.68863 | 31.20 |
| *26 | 39.8918 | 12.4725 | | |
| 27 | ∞ | 2.8500 | 1.51680 | 64.20 |
| 28 | ∞ | 0.2112 | | |

TABLE 26

Example 7

| | |
|---|---|
| f | 23.62 |
| Bf | 14.56 |
| FNo. | 1.44 |
| 2ω(°) | 67.6 |
| Ymax | 14.45 |

TABLE 27

Example 7

| | DD[12] | DD[22] |
|---|---|---|
| Infinity | 7.1000 | 1.7500 |
| 0.100 m | 2.3603 | 6.4897 |

TABLE 28

Example 7

| Sn | 21 | 22 | 25 | 26 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −2.5889736E−05 | 3.8776676E−05 | 7.2364942E−06 | −2.7396067E−05 |
| A5 | −1.2982469E−05 | −2.5112083E−05 | 5.0239052E−06 | 3.6746936E−05 |
| A6 | 3.9674529E−06 | 6.3074834E−06 | −2.1832431E−07 | −1.0191898E−05 |
| A7 | −3.3303227E−07 | −3.8211736E−07 | −2.7355498E−07 | 1.1281121E−06 |
| A8 | −3.6339144E−08 | −7.3012005E−08 | 3.9540483E−08 | −5.4977919E−09 |
| A9 | 8.3507781E−09 | 1.1737062E−08 | 1.0727165E−09 | −1.0847982E−08 |
| A10 | −8.8865392E−11 | 5.8414358E−11 | −4.4759311E−10 | 1.0246797E−09 |
| A11 | −6.1824538E−11 | −9.0385482E−11 | 1.2086165E−11 | −1.8775158E−11 |
| A12 | 2.4978937E−12 | 2.8952969E−12 | 1.4154146E−12 | −3.3599052E−12 |
| A13 | 1.5432811E−13 | 2.2843368E−13 | −6.6987628E−14 | 2.7496660E−13 |
| A14 | −8.6065364E−15 | −1.1340132E−14 | 1.6259149E−17 | −6.8934430E−15 |

Example 8

Figure 16:
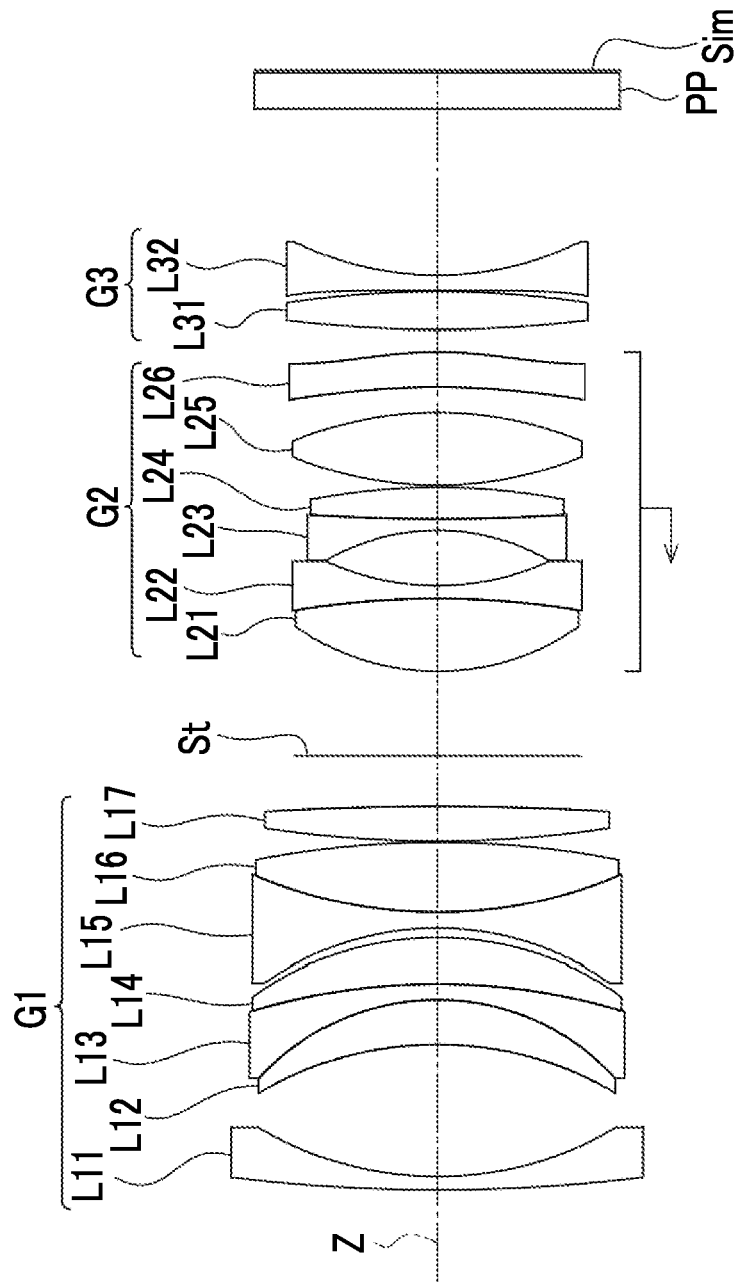
FIG. 16 is a cross-sectional view showing a configuration of an imaging lens of Example 8.

FIG. 16 is a cross-sectional view of a configuration of the imaging lens of Example 8. The imaging lens of Example 8 consists of, in order from the object side to the image side along the optical axis Z, a first lens group G1 having a positive refractive power, an aperture stop St, a second lens group G2 having a positive refractive power, and a third lens group G3 having a negative refractive power. The first lens group G1 consists of seven lenses L11 to L17 in order from the object side to the image side. The second lens group G2 consists of six lenses L21 to L26 in order from the object side to the image side. The third lens group G3 consists of two lenses L31 and L32 in order from the object side to the image side. During focusing from the infinite distance object to the extremely short range object, the entire second lens group G2 integrally moves to the object side, and the first lens group G1, the aperture stop St, and the third lens group G3 remain stationary with respect to the image plane Sim.

Figure 17:
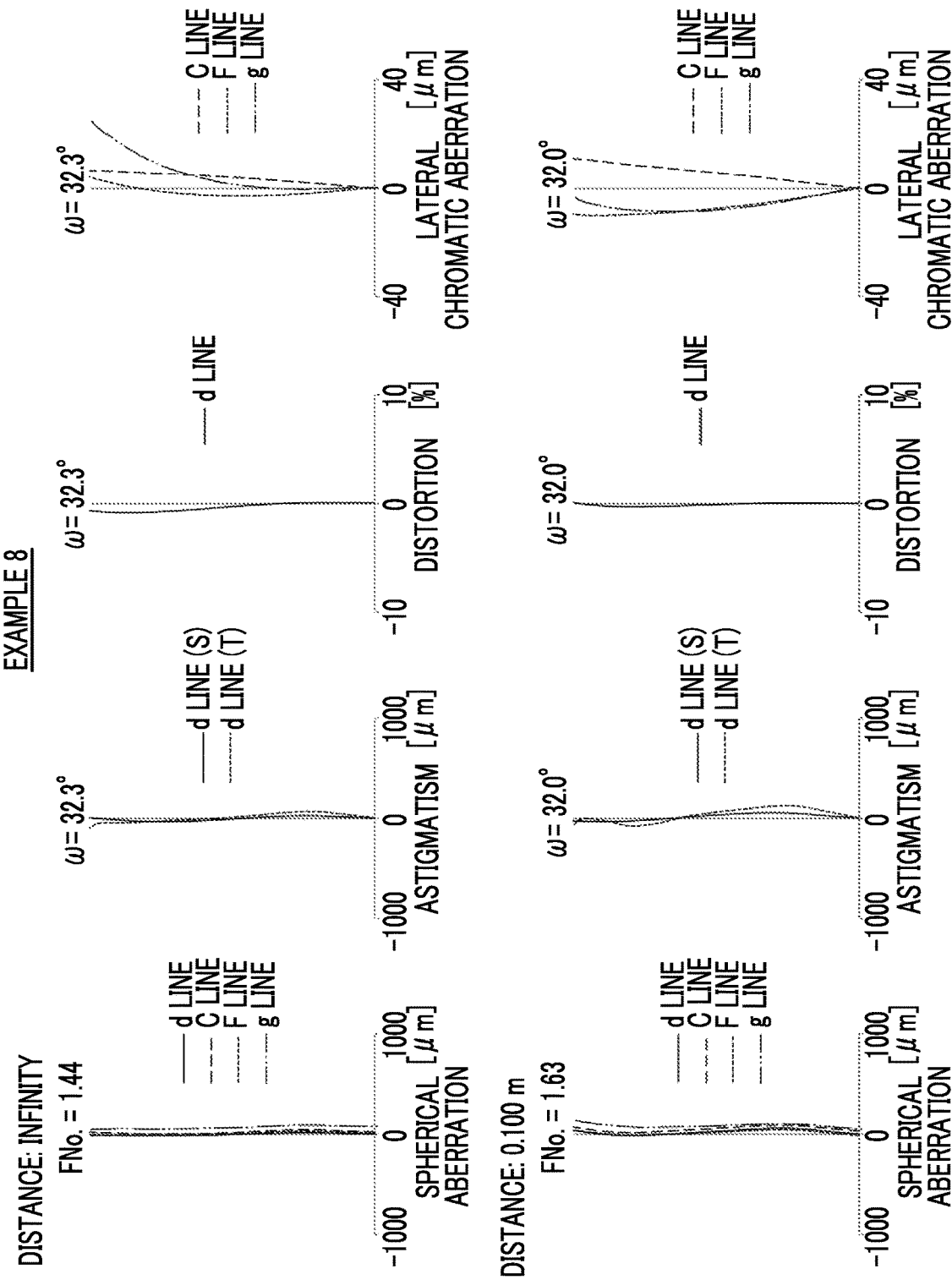
FIG. 17 is a diagram showing aberrations of the imaging lens of Example 8.

Regarding the imaging lens of Example 8, Table 29 shows basic lens data, Table 30 shows specifications, Table 31 shows variable surface spacings, Table 32 shows aspherical coefficients thereof, and FIG. 17 shows aberration diagrams.

TABLE 29

Example 8

| Sn | R | D | Nd | vd |
|---|---|---|---|---|
| 1 | 139.9486 | 1.0498 | 1.51823 | 58.90 |
| 2 | 29.0869 | 10.4868 | | |
| 3 | −29.0869 | 3.5322 | 1.88300 | 40.80 |
| 4 | −19.9835 | 1.2202 | 1.84666 | 23.78 |
| 5 | −54.3207 | 3.6417 | 1.88300 | 40.80 |
| 6 | −26.4351 | 0.7429 | | |
| 7 | −24.8702 | 1.2298 | 1.59551 | 39.24 |
| 8 | 38.7433 | 5.5446 | 1.88300 | 40.80 |
| 9 | −79.4134 | 0.0998 | | |
| 10 | 95.7734 | 2.7422 | 2.00272 | 19.32 |
| 11 | −238.0301 | 3.9998 | | |
| 12(St) | ∞ | DD[12] | | |
| 13 | 20.3728 | 5.7677 | 1.59522 | 67.73 |
| 14 | −70.8166 | 1.0098 | 1.59270 | 35.31 |
| 15 | 22.2838 | 4.3769 | | |
| 16 | −18.5201 | 0.9000 | 1.69895 | 30.13 |
| 17 | 163.9438 | 2.5098 | 1.49700 | 81.54 |
| 18 | −54.0480 | 0.1498 | | |
| 19 | 31.2029 | 5.7905 | 1.69680 | 55.53 |
| 20 | −31.2029 | 2.0002 | | |
| *21 | −68.9298 | 2.7502 | 1.80610 | 40.73 |
| *22 | −37.8981 | DD[22] | | |
| 23 | 107.1429 | 2.9841 | 1.90043 | 37.37 |
| 24 | −85.3555 | 0.0998 | | |
| *25 | −425.7814 | 1.1808 | 1.68948 | 31.02 |
| *26 | 27.5185 | 13.1822 | | |
| 27 | ∞ | 2.8500 | 1.51680 | 64.20 |
| 28 | ∞ | 0.1962 | | |

TABLE 30

Example 8

| | |
|---|---|
| f | 23.71 |
| Bf | 15.26 |
| FNo. | 1.44 |
| 2ω(°) | 64.6 |
| Ymax | 14.45 |

TABLE 31

Example 8

| | DD[12] | DD[22] |
|---|---|---|
| Infinity | 6.6948 | 1.7498 |
| 0.100 m | 2.4117 | 6.0329 |

TABLE 32

Example 8

| Sn | 21 | 22 | 25 | 26 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −1.5102877E−05 | 6.3383506E−05 | 1.8348921E−05 | −1.3479022E−05 |
| A5 | −1.7359712E−06 | −1.9433398E−05 | −4.1736242E−07 | 2.6472839E−05 |
| A6 | 1.6698604E−07 | 3.0757816E−06 | −1.4135943E−07 | −6.2158571E−06 |
| A7 | 2.3266805E−07 | 2.5622080E−07 | −2.0271440E−07 | 2.3481092E−07 |
| A8 | −6.1458937E−08 | −1.2619909E−07 | 1.9411073E−08 | 6.5475230E−08 |
| A9 | 3.9498037E−09 | 9.5233367E−09 | 3.4981326E−09 | −4.8885636E−09 |
| A10 | 5.9880730E−10 | 9.4520874E−10 | −3.6509688E−10 | −3.3170035E−10 |
| A11 | −8.8538416E−11 | −1.5271154E−10 | −2.2897809E−11 | 3.1643073E−11 |
| A12 | 7.0951900E−13 | 1.6148018E−12 | 2.5840300E−12 | 6.9748650E−13 |
| A13 | 3.6708516E−13 | 5.7294858E−13 | 5.0810891E−14 | −8.0889790E−14 |
| A14 | −1.4719948E−14 | −2.2942781E−14 | −6.3009453E−15 | 3.4975067E−16 |

Example 9

Figure 18:
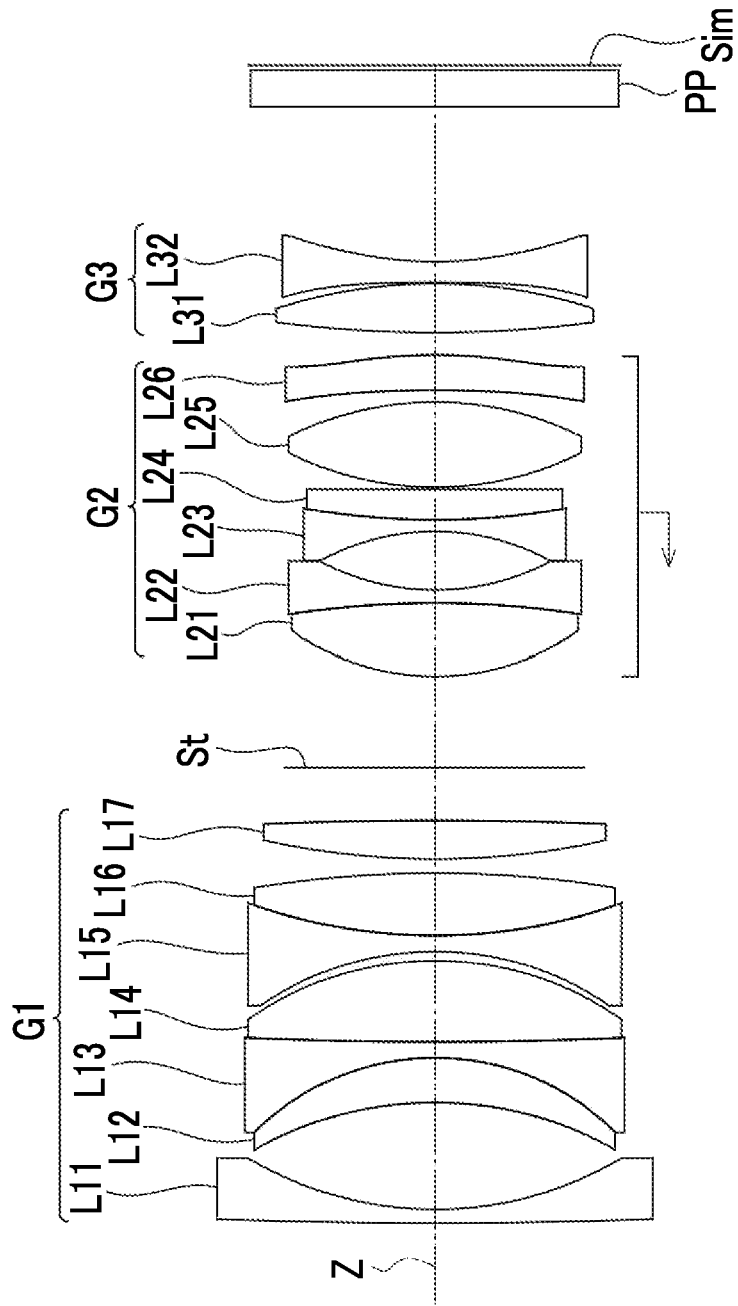
FIG. 18 is a cross-sectional view showing a configuration of an imaging lens of Example 9.

FIG. 18 is a cross-sectional view of a configuration of the imaging lens of Example 9. The imaging lens of Example 9 consists of, in order from the object side to the image side along the optical axis Z, a first lens group G1 having a positive refractive power, an aperture stop St, a second lens group G2 having a positive refractive power, and a third lens group G3 having a negative refractive power. The first lens group G1 consists of seven lenses L11 to L17 in order from the object side to the image side. The second lens group G2 consists of six lenses L21 to L26 in order from the object side to the image side. The third lens group G3 consists of two lenses L31 and L32 in order from the object side to the image side. During focusing from the infinite distance object to the extremely short range object, the entire second lens group G2 integrally moves to the object side, and the first lens group G1, the aperture stop St, and the third lens group G3 remain stationary with respect to the image plane Sim.

Figure 19:
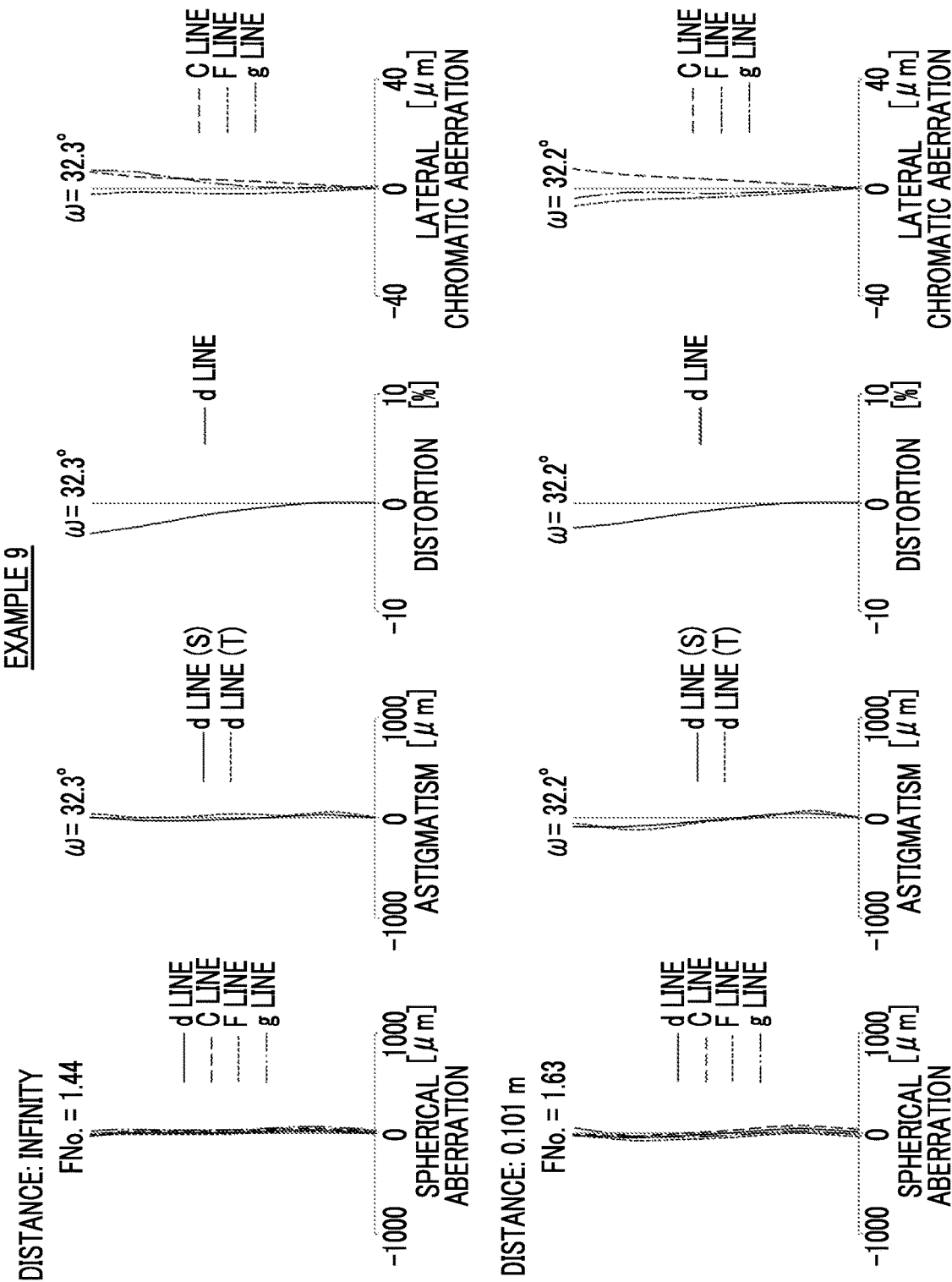
FIG. 19 is a diagram showing aberrations of the imaging lens of Example 9.

Regarding the imaging lens of Example 9, Table 33 shows basic lens data, Table 34 shows specifications, Table 35 shows variable surface spacings, Table 36 shows aspherical coefficients thereof, and FIG. 19 shows aberration diagrams.

TABLE 33

Example 9

| Sn | R | D | Nd | vd |
|---|---|---|---|---|
| 1 | 548.2052 | 1.0498 | 1.53996 | 59.46 |
| 2 | 30.0988 | 8.3769 | | |
| 3 | −30.0988 | 3.4998 | 1.87070 | 40.73 |
| 4 | −20.8548 | 1.2198 | 1.84666 | 23.78 |
| 5 | 350.0430 | 6.3724 | 1.88300 | 40.80 |
| 6 | −26.6255 | 0.7270 | | |
| 7 | −25.0762 | 1.2298 | 1.59270 | 35.31 |
| 8 | 45.1812 | 4.8919 | 1.88300 | 40.80 |
| 9 | −92.5753 | 1.0998 | | |
| 10 | 65.2909 | 3.0136 | 1.95906 | 17.47 |
| 11 | −346.6065 | 4.1078 | | |
| 12(St) | ∞ | DD[12] | | |
| 13 | 20.3462 | 5.7061 | 1.59522 | 67.73 |
| 14 | −78.0410 | 1.0098 | 1.54814 | 45.78 |
| 15 | 20.2596 | 4.5843 | | |
| 16 | −19.7705 | 0.9098 | 1.71736 | 29.52 |
| 17 | 62.1285 | 2.3998 | 1.80400 | 46.53 |
| 18 | ∞ | 0.1498 | | |
| 19 | 26.6348 | 6.6909 | 1.59522 | 67.73 |
| 20 | −26.6348 | 0.9176 | | |
| *21 | −111.4605 | 2.7502 | 1.80610 | 40.73 |
| *22 | −41.7915 | DD[22] | | |
| 23 | 100.9177 | 3.8331 | 1.59522 | 67.73 |
| 24 | −42.2678 | 0.0998 | | |
| *25 | −300.0317 | 1.5998 | 1.68863 | 31.20 |
| *26 | 27.5775 | 12.1185 | | |
| 27 | ∞ | 2.8500 | 1.51680 | 64.20 |
| 28 | ∞ | 0.3930 | | |

TABLE 34

Example 9

| | |
|---|---|
| f | 23.49 |
| Bf | 14.39 |
| FNo. | 1.44 |
| 2ω(°) | 64.6 |
| Ymax | 14.45 |

TABLE 35

Example 9

| | DD[12] | DD[22] |
|---|---|---|
| Infinity | 7.1148 | 1.7498 |
| 0.101 m | 2.5172 | 6.3474 |

TABLE 36

Example 9

| Sn | 21 | 22 | 25 | 26 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −4.7801373E−05 | 2.2240509E−05 | −8.3356523E−05 | −7.5596587E−05 |
| A5 | 6.9215981E−06 | −1.1376791E−05 | −1.9367709E−05 | −1.8492314E−05 |
| A6 | −6.8622890E−07 | 3.1952008E−06 | 7.3324240E−06 | 6.5798212E−06 |
| A7 | −9.9996641E−08 | −2.6475636E−07 | −6.1442391E−07 | −3.3792573E−07 |
| A8 | 2.1467223E−08 | −3.3569881E−08 | −7.0743831E−08 | −1.0858643E−07 |
| A9 | 7.7855785E−10 | 7.8050703E−09 | 1.4673085E−08 | 1.4864291E−08 |
| A10 | −2.1680645E−10 | −9.1887976E−11 | −1.2411505E−10 | 2.7493061E−10 |
| A11 | −3.5315851E−12 | −6.2243427E−11 | −1.0931964E−10 | −1.3615121E−10 |
| A12 | 1.1111461E−12 | 2.7515406E−12 | 4.5285723E−12 | 3.8896242E−12 |
| A13 | 7.3817056E−15 | 1.6313223E−13 | 2.7205612E−13 | 3.8379702E−13 |
| A14 | −2.5187775E−15 | −9.9272422E−15 | −1.5610307E−14 | −1.8375287E−14 |

Example 10

Figure 20:
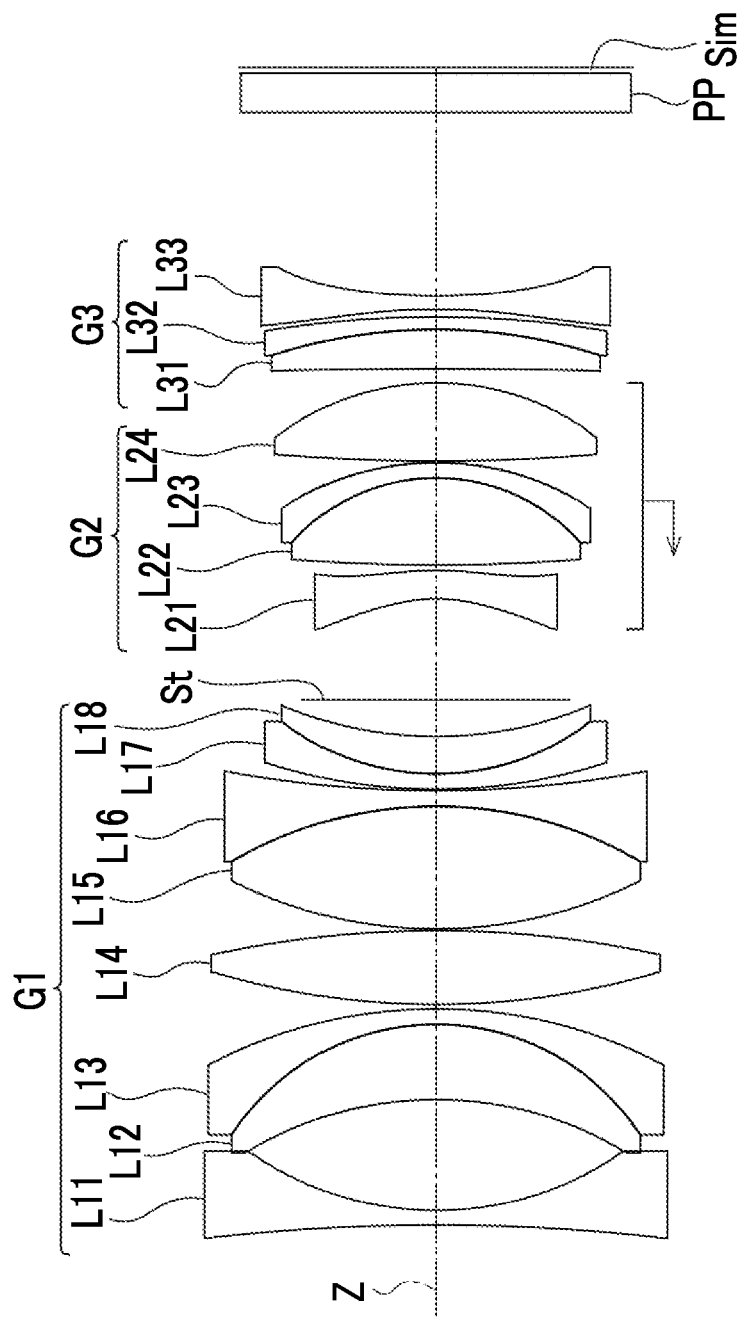
FIG. 20 is a cross-sectional view showing a configuration of an imaging lens of Example 10.

FIG. 20 is a cross-sectional view of a configuration of the imaging lens of Example 10. The imaging lens of Example 10 consists of, in order from the object side to the image side along the optical axis Z, a first lens group G1 having a positive refractive power, an aperture stop St, a second lens group G2 having a positive refractive power, and a third lens group G3 having a negative refractive power. The first lens group G1 consists of eight lenses L11 to L18 in order from the object side to the image side. The second lens group G2 consists of four lenses L21 to L24 in order from the object side to the image side. The third lens group G3 consists of three lenses L31 to L33 in order from the object side to the image side. During focusing from the infinite distance object to the extremely short range object, the entire second lens group G2 integrally moves to the object side, and the first lens group G1, the aperture stop St, and the third lens group G3 remain stationary with respect to the image plane Sim.

Figure 21:
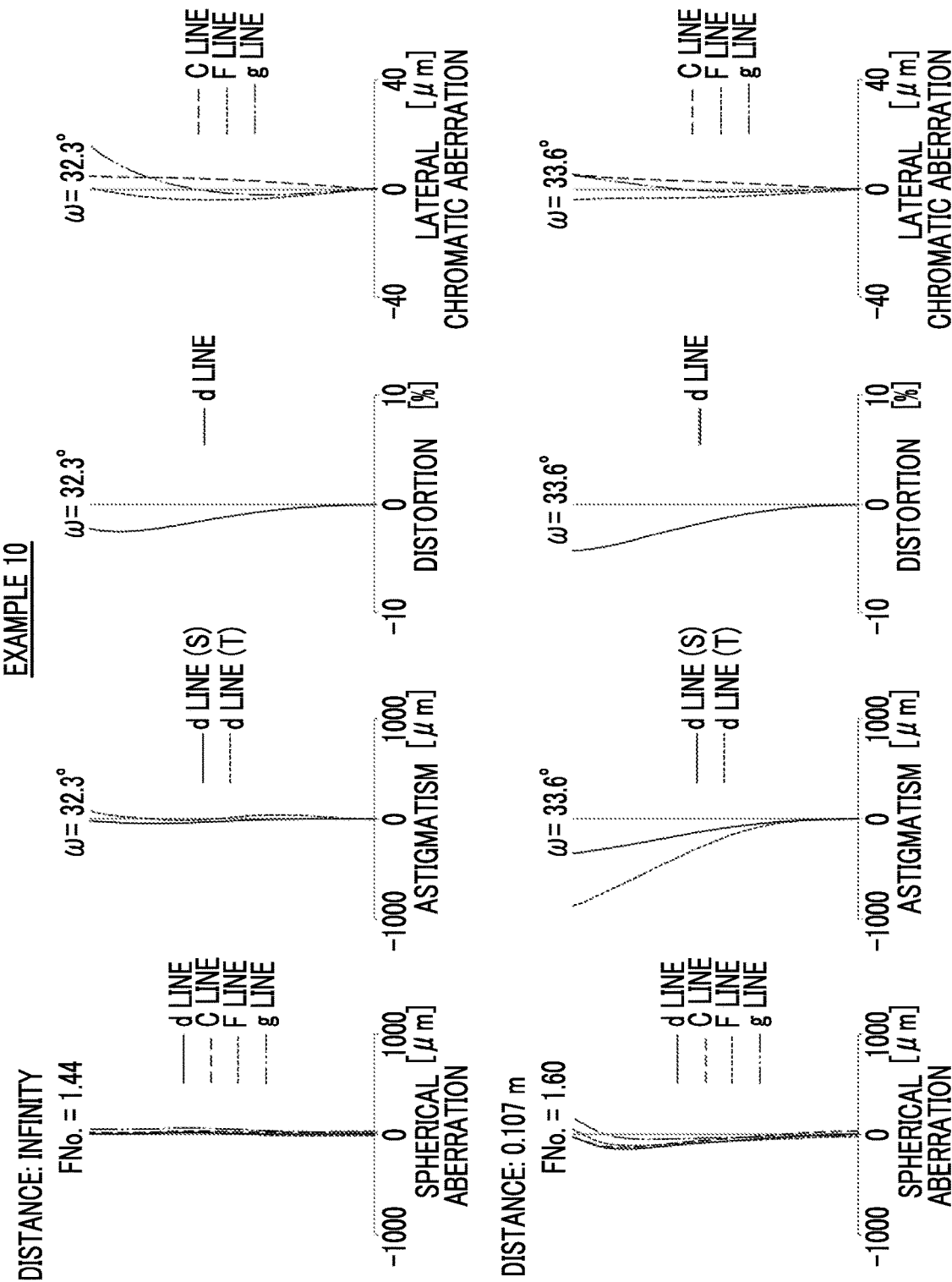
FIG. 21 is a diagram showing aberrations of the imaging lens of Example 10.

Regarding the imaging lens of Example 10, Table 37 shows basic lens data, Table 38 shows specifications, Table 39 shows variable surface spacings, Table 40 shows aspherical coefficients thereof, and FIG. 21 shows aberration diagrams.

TABLE 37

Example 10

| Sn | R | D | Nd | vd |
|---|---|---|---|---|
| 1 | −154.8338 | 1.0500 | 1.76182 | 26.52 |
| 2 | 24.7455 | 8.0862 | | |
| 3 | −27.8837 | 5.4644 | 1.88300 | 40.80 |
| 4 | −18.4852 | 1.1098 | 1.84666 | 23.78 |
| 5 | −37.3548 | 0.2998 | | |
| 6 | 59.7236 | 5.3696 | 1.95906 | 17.47 |
| 7 | −79.9378 | 0.0998 | | |
| 8 | 34.7701 | 8.9187 | 1.88300 | 40.80 |
| 9 | −30.8645 | 1.1300 | 1.84666 | 23.78 |
| 10 | 89.2464 | 0.1002 | | |
| 11 | 43.0144 | 1.1000 | 1.71736 | 29.52 |
| 12 | 19.1184 | 2.7390 | 1.59522 | 67.73 |

TABLE 37-continued

Example 10

| Sn | R | D | Nd | vd |
|---|---|---|---|---|
| 13 | 30.2443 | 2.6498 | | |
| 14(St) | ∞ | DD[14] | | |
| *15 | −12.1951 | 2.0612 | 1.68948 | 31.02 |
| *16 | −23.6839 | 0.3838 | | |
| 17 | 142.5329 | 6.3300 | 1.53775 | 74.70 |
| 18 | −14.6114 | 1.1113 | 1.59270 | 35.31 |
| 19 | −21.5153 | 0.0998 | | |
| 20 | 147.8213 | 5.6863 | 1.49700 | 81.54 |
| 21 | −20.0001 | DD[21] | | |
| 22 | −515.9693 | 2.8618 | 1.95375 | 32.32 |
| 23 | −40.4783 | 0.9100 | 1.83400 | 37.16 |
| 24 | −79.7067 | 0.5368 | | |
| *25 | −50.0351 | 0.9998 | 1.68948 | 31.02 |
| *26 | 50.1275 | 13.3087 | | |
| 27 | ∞ | 2.8500 | 1.51680 | 64.20 |
| 28 | ∞ | 0.3974 | | |

TABLE 38

Example 10

| | |
|---|---|
| f | 23.70 |
| Bf | 15.59 |
| FNo. | 1.44 |
| 2ω(°) | 64.6 |
| Ymax | 14.45 |

TABLE 39

Example 10

| | DD[14] | DD[21] |
|---|---|---|
| Infinity | 7.2848 | 0.9998 |
| 0.107 m | 3.7641 | 4.5205 |

TABLE 40

Example 10

| Sn | 15 | 16 | 25 | 26 |
|---|---|---|---|---|
| KA | 1.0000000E+00 | 1.0000000E+00 | 1.0000000E+00 | 1.0000000E+00 |
| A4 | 3.5359595E−04 | 3.1804762E−04 | 9.9176004E−06 | 2.2065603E−05 |
| A6 | −2.0214951E−06 | −1.2913491E−06 | 3.6295274E−08 | −4.9239273E−08 |
| A8 | 9.1326289E−09 | −9.0711569E−10 | −3.7902692E−10 | 1.6559069E−09 |
| A10 | 2.4832175E−11 | 7.9463416E−11 | 6.0651560E−12 | −5.5935643E−12 |
| A12 | −4.4158842E−13 | −4.8234070E−13 | 5.3290370E−15 | −1.2166009E−14 |
| A14 | 7.9360420E−16 | −1.2085089E−15 | −2.9338904E−16 | 2.7819837E−16 |
| A16 | 1.1066860E−17 | 1.5582530E−17 | 8.8732247E−19 | −9.4916782E−19 |

Example 11

Figure 22:
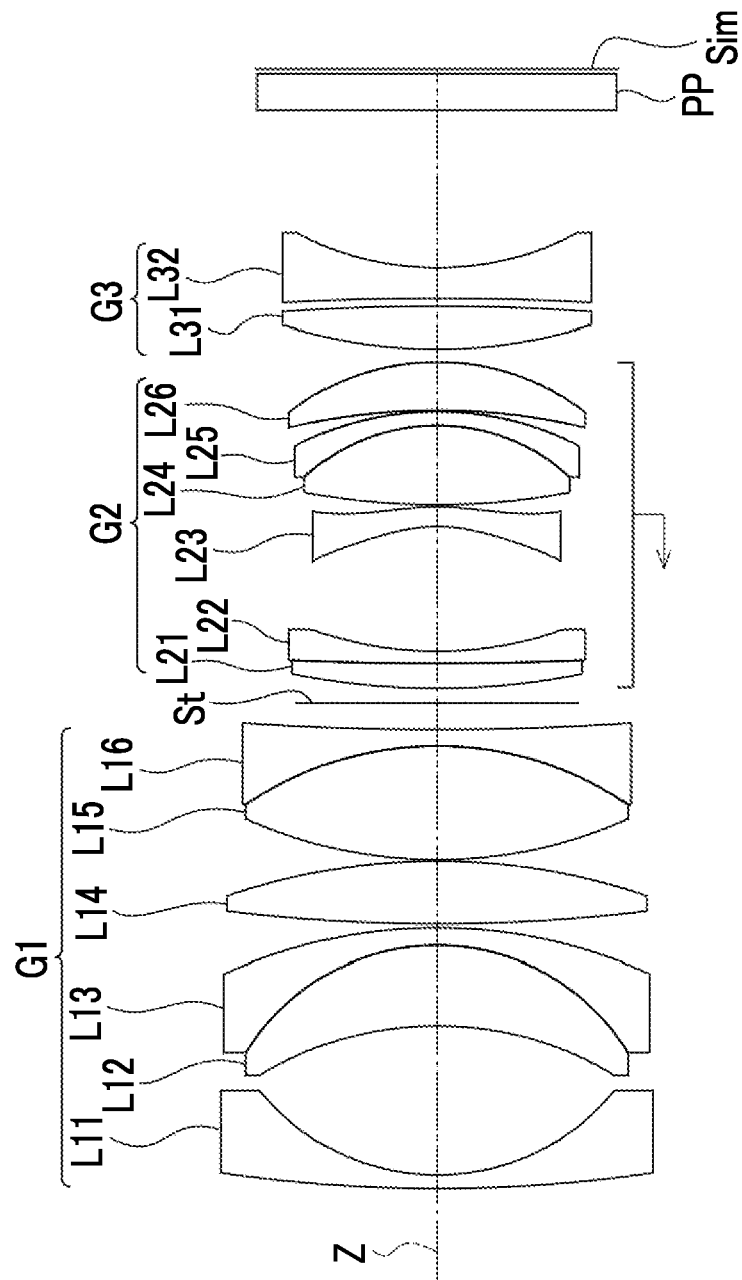
FIG. 22 is a cross-sectional view showing a configuration of an imaging lens of Example 11.

FIG. 22 is a cross-sectional view of a configuration of the imaging lens of Example 11. The imaging lens of Example 11 consists of, in order from the object side to the image side along the optical axis Z, a first lens group G1 having a positive refractive power, an aperture stop St, a second lens group G2 having a positive refractive power, and a third lens group G3 having a negative refractive power. The first lens group G1 consists of six lenses L11 to L16 in order from the object side to the image side. The second lens group G2 consists of six lenses L21 to L26 in order from the object side to the image side. The third lens group G3 consists of two lenses L31 and L32 in order from the object side to the image side. During focusing from the infinite distance object to the extremely short range object, the entire second lens group G2 integrally moves to the object side, and the first lens group G1, the aperture stop St, and the third lens group G3 remain stationary with respect to the image plane Sim.

Figure 23:
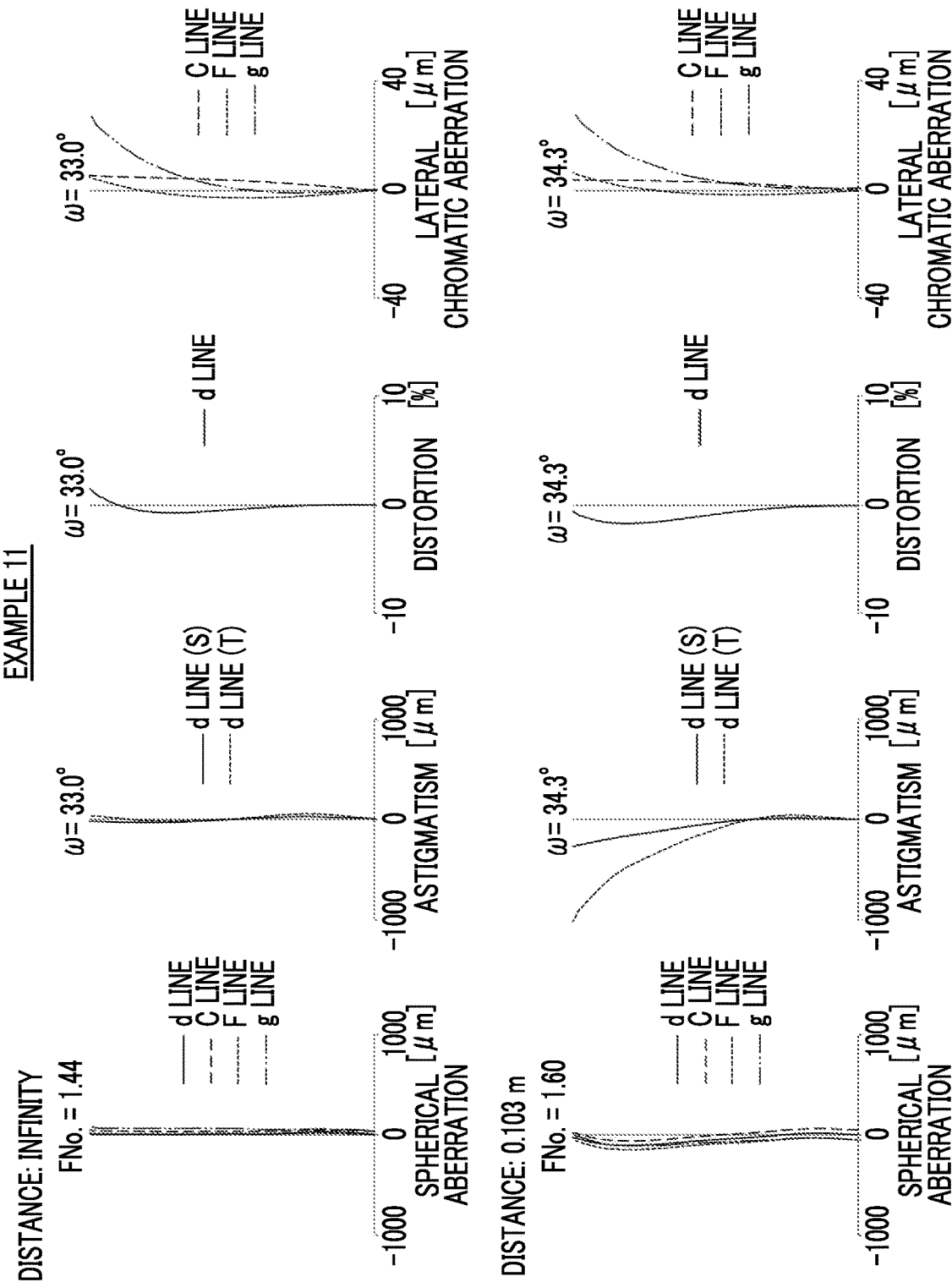
FIG. 23 is a diagram showing aberrations of the imaging lens of Example 11.

Regarding the imaging lens of Example 11, Table 41 shows basic lens data, Table 42 shows specifications, Table 43 shows variable surface spacings, Table 44 shows aspherical coefficients thereof, and FIG. 23 shows aberration diagrams.

TABLE 41

Example 11

| Sn | R | D | Nd | νd |
|---|---|---|---|---|
| 1 | 125.4351 | 1.0502 | 1.62004 | 36.26 |
| 2 | 18.8555 | 11.7785 | | |
| 3 | −28.3853 | 6.3395 | 1.75500 | 52.32 |
| 4 | −18.3959 | 1.3500 | 1.84666 | 23.78 |
| 5 | −42.8987 | 0.3002 | | |
| 6 | 146.8352 | 4.9291 | 2.00272 | 19.32 |
| 7 | −54.3981 | 0.1002 | | |
| 8 | 38.7032 | 9.0203 | 1.81600 | 46.62 |
| 9 | −27.9993 | 1.2702 | 1.75520 | 27.51 |
| 10 | 234.3662 | 2.1001 | | |
| 11 (St) | ∞ | DD[11] | | |
| 12 | 61.3220 | 1.9588 | 1.49700 | 81.54 |
| 13 | 270.1844 | 0.9601 | 1.64769 | 33.79 |
| 14 | 31.1765 | 9.8642 | | |
| *15 | −12.2024 | 1.5614 | 1.68948 | 31.02 |
| *16 | −19.7514 | 0.1500 | | |
| 17 | 60.0682 | 6.2583 | 1.49700 | 81.54 |
| 18 | −16.1714 | 1.0898 | 1.53172 | 48.84 |
| 19 | −25.6745 | 0.1000 | | |
| 20 | −52.5501 | 3.8095 | 1.72916 | 54.68 |
| 21 | −20.0024 | DD[21] | | |
| 22 | 42.1268 | 3.3522 | 1.49700 | 81.54 |
| 23 | −178.0987 | 0.6019 | | |
| *24 | −5345.8044 | 2.4198 | 1.68948 | 31.02 |
| *25 | 24.0001 | 12.4272 | | |
| 26 | ∞ | 2.8500 | 1.51680 | 64.20 |
| 27 | ∞ | 0.3979 | | |

TABLE 42

Example 11

| | |
|---|---|
| f | 22.32 |
| Bf | 14.70 |
| FNo. | 1.44 |
| 2ω(°) | 66.0 |
| Ymax | 14.45 |

TABLE 43

Example 11

| | DD[11] | DD[21] |
|---|---|---|
| Infinity | 9.8642 | 1.0002 |
| 0.103 m | 6.1350 | 4.7294 |

TABLE 44

Example 11

| Sn | 15 | 16 | 24 | 25 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 3.5521745E−04 | 3.6221580E−04 | −4.0891452E−05 | −3.4407482E−05 |
| A5 | 3.0945359E−05 | 5.6750044E−06 | −3.1129744E−06 | −4.9159148E−06 |
| A6 | −7.7722965E−06 | −1.7431053E−06 | 7.6778831E−07 | 8.9357301E−07 |
| A7 | −4.2759814E−07 | −2.2103019E−07 | −2.2425171E−08 | 1.2256715E−08 |
| A8 | 2.4173944E−07 | 2.5723753E−08 | 4.0939433E−09 | −4.4637427E−09 |
| A9 | −1.5166943E−08 | −1.4019953E−09 | −9.5271729E−10 | 1.1258358E−10 |
| A10 | −2.7957407E−09 | 4.6345451E−10 | 4.9412808E−11 | 5.9832709E−12 |
| A11 | 4.0760864E−10 | −5.5486410E−11 | 3.3659799E−12 | −5.9695379E−13 |
| A12 | −1.5170960E−12 | −5.9305419E−13 | −5.0104276E−13 | −1.9962977E−14 |
| A13 | −2.1851274E−12 | 4.4025036E−13 | 2.2577490E−14 | 9.0365163E−15 |
| A14 | 9.4478785E−14 | −1.9658418E−14 | −3.9456597E−16 | −4.4258856E−16 |

Example 12

Figure 24:
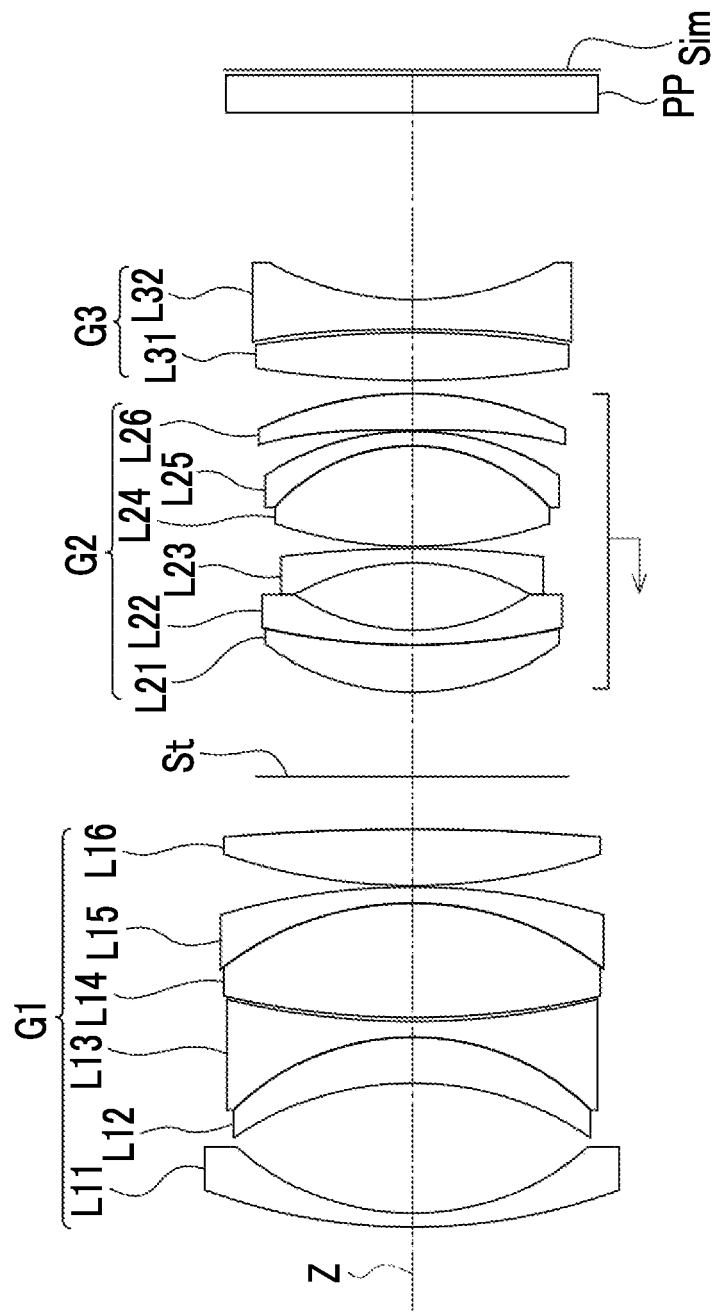
FIG. 24 is a cross-sectional view showing a configuration of an imaging lens of Example 12.

FIG. 24 is a cross-sectional view of a configuration of the imaging lens of Example 12. The imaging lens of Example 12 consists of, in order from the object side to the image side along the optical axis Z, a first lens group G1 having a positive refractive power, an aperture stop St, a second lens group G2 having a positive refractive power, and a third lens group G3 having a negative refractive power. The first lens group G1 consists of six lenses L11 to L16 in order from the object side to the image side. The second lens group G2 consists of six lenses L21 to L26 in order from the object side to the image side. The third lens group G3 consists of two lenses L31 and L32 in order from the object side to the image side. During focusing from the infinite distance object to the extremely short range object, the entire second lens group G2 integrally moves to the object side, and the first lens group G1, the aperture stop St, and the third lens group G3 remain stationary with respect to the image plane Sim.

Figure 25:
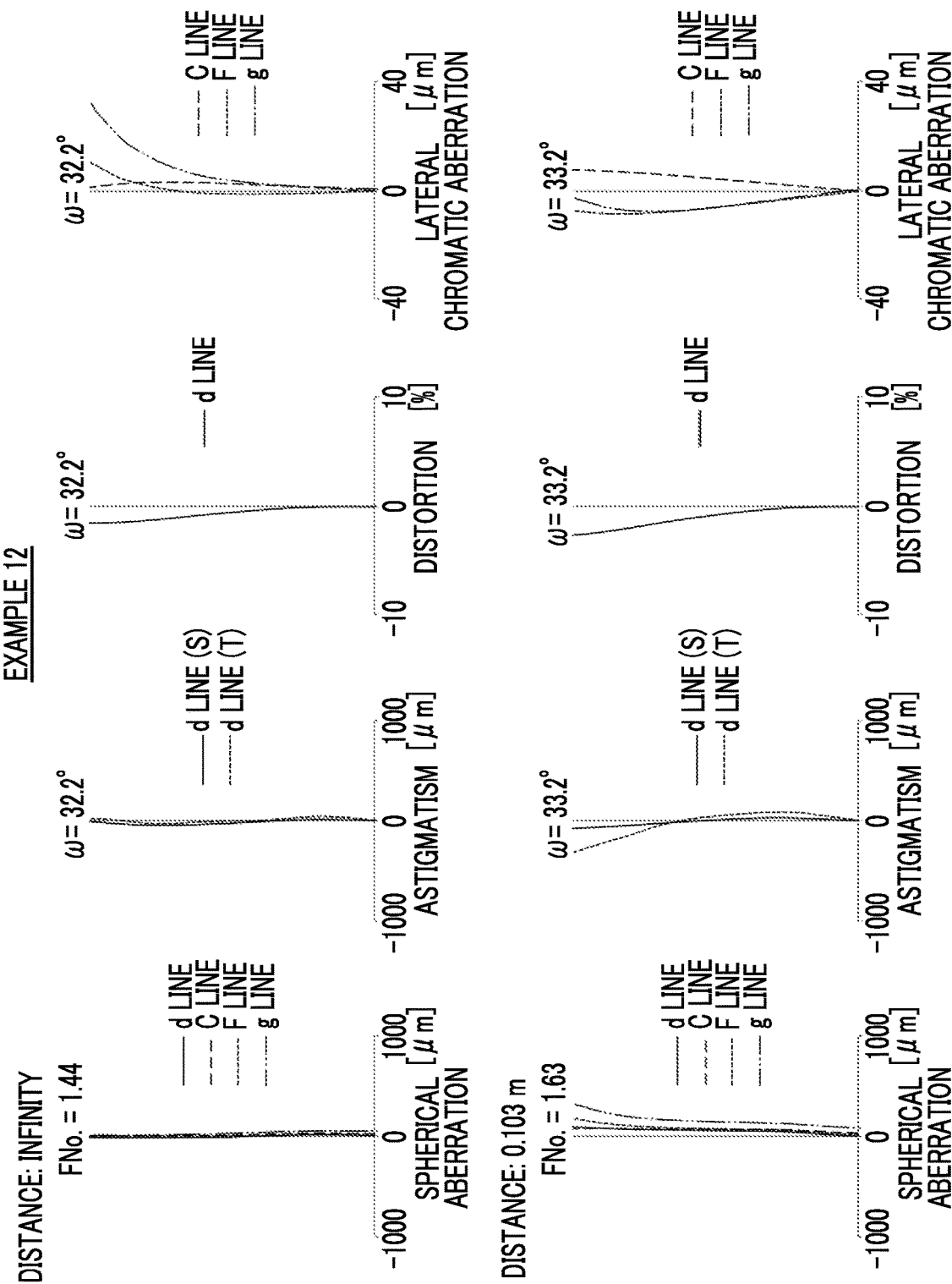
FIG. 25 is a diagram showing aberrations of the imaging lens of Example 12.

Regarding the imaging lens of Example 12, Table 45 shows basic lens data, Table 46 shows specifications, Table 47 shows variable surface spacings, Table 48 shows aspherical coefficients thereof, and FIG. 25 shows aberration diagrams.

TABLE 45

Example 12

| Sn | R | D | Nd | νd |
|---|---|---|---|---|
| 1 | 47.7468 | 1.0500 | 1.51742 | 52.43 |
| 2 | 21.2038 | 9.9691 | | |
| 3 | −25.5034 | 3.5101 | 1.88300 | 40.80 |
| 4 | −20.3405 | 1.1601 | 1.89286 | 20.36 |
| 5 | 62.4133 | 0.3154 | | |
| 6 | 67.4771 | 8.7372 | 1.87070 | 40.73 |
| 7 | −24.7146 | 1.2100 | 1.51742 | 52.43 |
| 8 | −54.0802 | 0.1000 | | |
| 9 | 46.6186 | 4.3011 | 1.95906 | 17.47 |
| 10 | −184.4758 | 4.0300 | | |
| 11 (St) | ∞ | DD[11] | | |

TABLE 45-continued

Example 12

| Sn | R | D | Nd | νd |
|---|---|---|---|---|
| 12 | 20.0473 | 3.5530 | 1.59522 | 67.73 |
| 13 | 52.9857 | 1.1102 | 1.57501 | 41.50 |
| 14 | 16.8465 | 5.1471 | | |
| 15 | −18.8358 | 1.0902 | 1.84666 | 23.78 |
| 16 | −86.3305 | 0.1502 | | |
| 17 | 33.5735 | 7.6907 | 1.59522 | 67.73 |
| 18 | −14.6114 | 1.1115 | 1.95375 | 32.32 |
| 19 | −21.2257 | 0.1002 | | |
| *20 | −197.2985 | 2.7617 | 1.80610 | 40.73 |
| *21 | −28.9249 | DD[21] | | |
| 22 | 79.4123 | 3.6492 | 1.87070 | 40.73 |
| 23 | −79.4612 | 0.2458 | | |
| *24 | −172.7739 | 2.2498 | 1.68948 | 31.02 |
| *25 | 21.6021 | 14.3040 | | |
| 26 | ∞ | 2.8500 | 1.51680 | 64.20 |
| 27 | ∞ | 0.3900 | | |

TABLE 46

Example 12

| | |
|---|---|
| f | 23.70 |
| Bf | 16.57 |
| FNo. | 1.44 |
| 2ω(°) | 64.4 |
| Ymax | 14.45 |

TABLE 47

Example 12

| | DD[11] | DD[21] |
|---|---|---|
| Infinity | 6.4138 | 1.0002 |
| 0.103 m | 2.3312 | 5.0828 |

TABLE 48

Example 12

| Sn | 20 | 21 | 24 | 25 |
|---|---|---|---|---|
| KA | 1.0000000E+00 | 1.0000000E+00 | 1.0000000E+00 | 1.0000000E+00 |
| A3 | −4.0155636E−19 | 4.0155636E−19 | −7.8958738E−20 | 0.0000000E+00 |
| A4 | −3.5349911E−05 | 1.1541943E−05 | −1.3636585E−06 | 1.1521011E−06 |
| A5 | 5.3532862E−06 | 1.2897051E−06 | −9.6435332E−06 | −1.3727576E−05 |
| A6 | −2.3397354E−06 | −2.0346767E−06 | 7.6659223E−08 | 1.3830592E−06 |
| A7 | 3.7875758E−07 | 4.2942148E−07 | 2.9030848E−07 | 9.4028519E−08 |
| A8 | −1.9662970E−08 | −3.0455874E−08 | −2.6956025E−08 | −1.2300418E−08 |
| A9 | −3.1318661E−09 | −2.7723563E−09 | −1.2489515E−09 | −4.5439545E−10 |
| A10 | 5.7104189E−10 | 6.3923151E−10 | 2.8397704E−10 | −1.9193101E−11 |
| A11 | −2.3351791E−11 | −2.9170662E−11 | −9.2166440E−12 | 1.2126577E−11 |
| A12 | −1.7051035E−12 | −1.7565187E−12 | −6.0609673E−13 | −8.8979183E−14 |
| A13 | 1.8581535E−13 | 2.0394784E−13 | 5.1751559E−14 | −6.7909557E−14 |
| A14 | −4.6964901E−15 | −5.1671432E−15 | −1.1422654E−15 | 2.6652540E−15 |

Table 49 shows the corresponding values of Conditional Expressions (1) to (11) of the imaging lenses of the above-mentioned examples. Table 49 shows values in a case where the d line is used as a reference.

TABLE 49

| Expression number | | Example 1 | Example 2 | Example 3 | Example 4 |
|---|---|---|---|---|---|
| (1) | Bf/f | 0.387 | 0.389 | 0.339 | 0.387 |
| (2) | TTL × FNo/Ymax | 8.391 | 7.591 | 8.223 | 6.683 |
| (3) | f/f2 | 0.874 | 1.368 | 0.757 | 0.838 |
| (4) | f/f3 | −0.342 | −0.096 | −0.258 | 0.145 |
| (5) | f1/f2 | 1.500 | 2.226 | 1.659 | 5.382 |
| (6) | f2/f2p | 1.432 | 2.412 | 2.200 | 1.245 |
| (7) | StI/LpTI | 2.985 | 2.112 | 3.135 | 1.235 |
| (8) | f2p/f2n | −0.879 | −0.921 | −0.888 | −1.464 |
| (9) | StI/TTL | 0.747 | 0.719 | 0.655 | 0.619 |
| (10) | \|{βf/ff × γ} − 1/(β3 × f3) − (1/De)} × Ymax\| | 0.081 | 0.096 | 0.023 | 0.308 |
| (11) | (Raf + Rar)/(Raf − Rar) | 0.256 | 0.326 | 0.078 | −0.331 |

| Expression number | | Example 5 | Example 6 | Example 7 | Example 8 |
|---|---|---|---|---|---|
| (1) | Bf/f | 0.386 | 0.388 | 0.617 | 0.787 |
| (2) | TTL × FNo/Ymax | 6.875 | 7.620 | 8.951 | 9.073 |
| (3) | f/f2 | 0.944 | 0.831 | 0.658 | 0.704 |
| (4) | f/f3 | 0.005 | 0.026 | −0.144 | −0.170 |
| (5) | f1/f2 | 7.308 | 13.874 | 1.887 | 2.233 |
| (6) | f2/f2p | 1.264 | 1.415 | 1.542 | 1.448 |
| (7) | StI/LpTI | 1.275 | 1.430 | 2.147 | 1.924 |
| (8) | f2p/f2n | −1.343 | −1.444 | −1.314 | −0.980 |
| (9) | StI/TTL | 0.613 | 0.684 | 0.611 | 0.623 |
| (10) | \|{βf/ff × γ} − 1/(β3 × f3) − (1/De)} × Ymax\| | 0.275 | 0.213 | 0.019 | 0.03 |
| (11) | (Raf + Rar)/(Raf − Rar) | −0.276 | −0.214 | 0.032 | 0.092 |

| Expression number | | Example 9 | Example 10 | Example 11 | Example 12 |
|---|---|---|---|---|---|
| (1) | Bf/f | 0.613 | 0.680 | 0.659 | 0.699 |
| (2) | TTL × FNo/Ymax | 8.919 | 8.321 | 8.391 | 8.444 |
| (3) | f/f2 | 0.643 | 0.931 | 0.784 | 0.808 |
| (4) | f/f3 | −0.156 | −0.375 | −0.284 | −0.296 |
| (5) | f1/f2 | 1.723 | 1.532 | 1.555 | 1.529 |
| (6) | f2/f2p | 1.556 | 1.019 | 1.080 | 1.612 |
| (7) | StI/LpTI | 2.127 | 1.547 | 1.449 | 1.232 |
| (8) | f2p/f2n | −1.128 | −0.635 | −0.521 | −0.634 |
| (9) | StI/TTL | 0.602 | 0.544 | 0.466 | 0.403 |
| (10) | \|{βf/ff × γ} − 1/(β3 × f3) − (1/De)} × Ymax\| | 0.003 | 0.125 | 0.033 | 0.126 |
| (11) | (Raf + Rar)/(Raf − Rar) | 0.012 | — | 0.437 | −0.056 |

Figure 26:
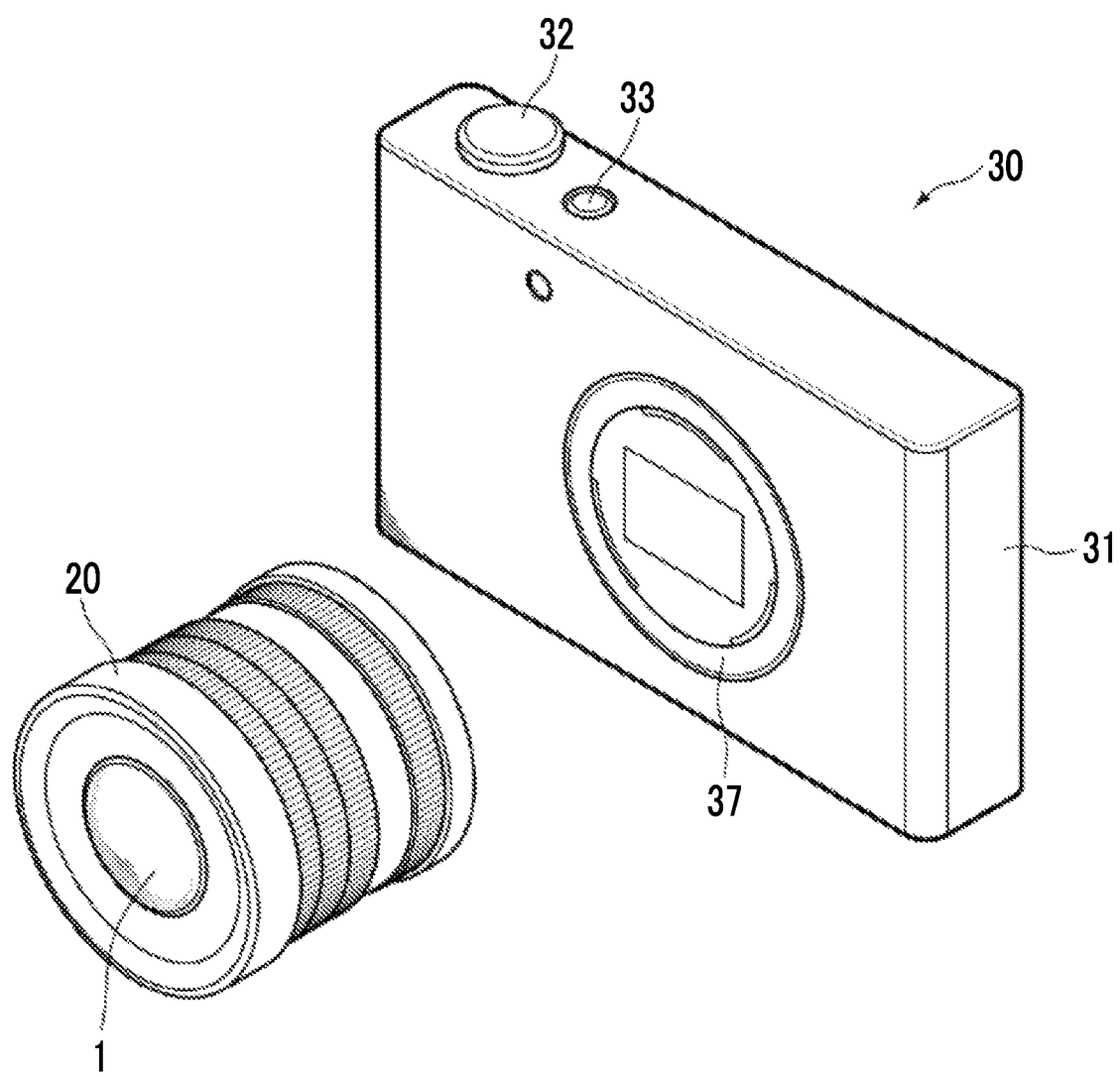
FIG. 26 is a perspective view of the front side of an imaging apparatus according to an embodiment.
Figure 27:
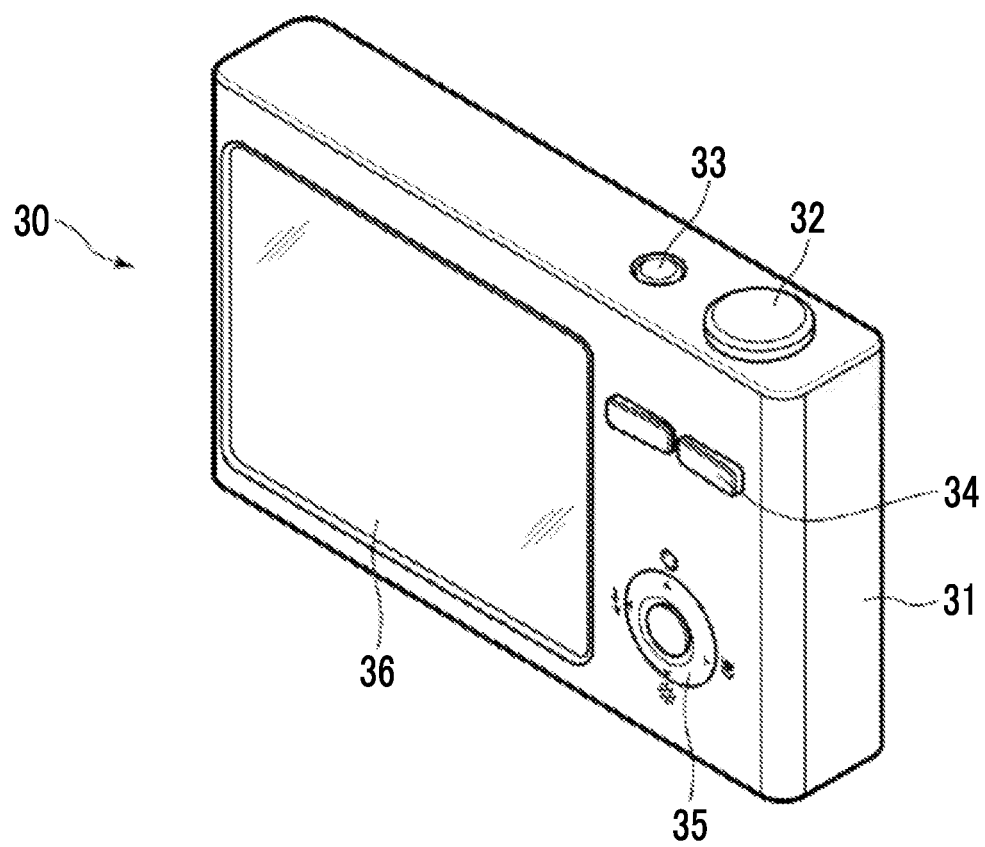
FIG. 27 is a perspective view of the rear side of the imaging apparatus according to the embodiment.

Next, an imaging apparatus according to an embodiment of the present disclosure will be described. FIGS. 26 and 27 are external views of a camera 30 which is the imaging apparatus according to the embodiment of the present disclosure. FIG. 26 is a perspective view of the camera 30 viewed from a front side, and FIG. 27 is a perspective view of the camera 30 viewed from a rear side. The camera 30 is a so-called mirrorless type digital camera, and the interchangeable lens 20 can be removably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video when the shutter button 32 is pressed, and is able to store image data, which is obtained through imaging, in the storage medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens consisting of, in order from an object side to an image side: a first lens group that has a positive refractive power; a stop; a second lens group that has a positive refractive power; and a third lens group,
wherein the third lens group includes one or more positive lenses and one or more negative lenses,
during focusing, an entirety of the first lens group, the stop, and the second lens group, or an entirety of the second lens group integrally moves as a focus group, and the third lens group remains stationary with respect to an image plane, and
assuming that
a back focal length of the imaging lens at an air conversion distance in a state in which an infinite distance object is in focus is Bf,
a focal length of the imaging lens in a state in which the infinite distance object is in focus is f,
a sum of Bf and a distance on an optical axis from a lens surface closest to the object side in the first lens group to a lens surface closest to the image side in the third lens group in a state in which the infinite distance object is in focus is TTL,
an open F number in a state in which the infinite distance object is in focus is FNo, and
a maximum image height is Ymax,
Conditional Expressions (1) and (2) are satisfied, which are represented by $$0.1 < Bf/f < 1.2 \qquad (1), \text{ and}$$

$$5 < TTL \times FNo/Y\text{max} < 9.2 \qquad (2),$$

wherein assuming that
a focal length of the first lens group is f1, and
a focal length of the second lens group is f2,
Conditional Expression (5) is satisfied, which is represented by $$1 < f1/f2 < 3.5. \qquad (5)$$

and
wherein the second lens group includes one or more air lenses formed by two concave lens surfaces facing toward each other, and
assuming that a curvature radius of an object side surface of at least one of the air lenses of the second lens group is Raf and a curvature radius of an image side surface thereof is Rar,
Conditional Expression (11) is satisfied, which is represented by $$-0.4 < (Raf + Rar)/(Raf - Rar) < 0.6. \qquad (11)$$

2. The imaging lens according to claim 1, wherein Conditional Expression (1-3) is satisfied, which is represented by $$0.4 < Bf/f < 1 \qquad (1-3).$$

3. The imaging lens according to claim 1, wherein Conditional Expression (3) is satisfied, which is represented by $$0.2 < f/f2 < 2 \qquad (3).$$

4. The imaging lens according to claim 1, wherein assuming that a focal length of the third lens group is f3, Conditional Expression (4) is satisfied, which is represented by $$-0.5 < f/f3 < -0.05. \qquad (4)$$

5. The imaging lens according to claim 1,
wherein among positive lenses in the second lens group, an Lp lens having a strongest refractive power has a convex surface facing toward the image side, and
assuming that a focal length of the Lp lens is f2p, Conditional Expression (6) is satisfied, which is represented by $$0.9 < f2/f2p < 3.5. \qquad (6)$$

6. The imaging lens according to claim 5, wherein assuming that
a sum of Bf and a distance on the optical axis from the stop to the lens surface closest to the image side in the third lens group in a state in which the infinite distance object is in focus is StI, and
a sum of Bf and a distance on the optical axis from an image side surface of the Lp lens to the lens surface closest to the image side in the third lens group in a state in which the infinite distance object is in focus is LpTI,
Conditional Expression (7) is satisfied, which is represented by $$1 < StI/LpTI < 4.5. \qquad (7)$$

7. The imaging lens according to claim 5,
wherein the second lens group includes one or more negative lenses,
among the negative lenses in the second lens group, an Ln lens having a strongest refractive power is located closer to the object side than the Lp lens, and
assuming that a focal length of the Ln lens is f2n, Conditional Expression (8) is satisfied, which is represented by $$-2 > f2p/f2n < -0.4. \qquad (8)$$

8. The imaging lens according to claim 1, wherein assuming that
a sum of Bf and a distance on the optical axis from the stop to the lens surface closest to the image side in the third lens group in a state in which the infinite distance object is in focus is StI, Conditional Expression (9) is satisfied, which is represented by $$0.3 < StI/TTL < 0.85. \tag{9}$$

9. The imaging lens according to claim 1, wherein assuming that
   a lateral magnification of the focus group in a state in which the infinite distance object is in focus is βf,
   a lateral magnification of the third lens group in a state in which the infinite distance object is in focus is β3,
   a focal length of the focus group is ff,
   a distance from the image plane to an exit pupil position in a state in which the infinite distance object is in focus is De,
   a sign of De is positive in a case where the exit pupil position is closer to the object side than the image plane, and is negative in a case where the exit pupil position is closer to the image side than the image plane, and $$\gamma = (1 - \beta f^2) \times \beta 3^2,$$

Conditional Expression (10) is satisfied, which is represented by $$0 < |\{\beta f/(f\!f \times \gamma) - 1/(\beta 3 \times f3) - (1/De)\} \times Y\max| < 0.15. \tag{10}$$

10. The imaging lens according to claim 1, wherein the focus group includes one or more cemented lenses each including one or more positive lenses and one or more negative lenses.

11. The imaging lens according to claim 1,
    wherein a lens closest to the object side in the focus group has a convex surface facing toward the object side, and a lens closest to the image side in the focus group has a convex surface facing toward the image side.

12. The imaging lens according to claim 1, wherein the focus group includes one or more positive lenses and one or more negative lenses.

13. The imaging lens according to claim 1, wherein during focusing, the entire second lens group integrally moves, and the first lens group remains stationary with respect to the image plane.

14. The imaging lens according to claim 1, wherein the first lens group includes one or more cemented lenses each including one or more positive lenses and one or more negative lenses.

15. The imaging lens according to claim 1, wherein a lens closest to the object side in the first lens group is a negative lens having a concave surface facing toward the image side.

16. The imaging lens according to claim 1, wherein Conditional Expression (2-1) is satisfied, which is represented by $$5.5 < TTL \times FNo/Y\max < 9.2. \tag{2-1}$$

17. The imaging lens according to claim 3, wherein Conditional Expression (3-1) is satisfied, which is represented by $$0.4 < f/f2 < 1.8. \tag{3-1}$$

18. An imaging apparatus comprising:
    the imaging lens according to claim 1; and
    an imaging element for outputting a captured image signal based on a subject image which is formed by the imaging lens.

* * * * *